United States Patent
Roth et al.

(10) Patent No.: US 9,584,517 B1
(45) Date of Patent: Feb. 28, 2017

(54) TRANSFORMS WITHIN SECURE EXECUTION ENVIRONMENTS

(71) Applicant: Amazon Technologies, Inc., Reno, NV (US)

(72) Inventors: Gregory Branchek Roth, Seattle, WA (US); Aaron Douglas Dokey, Seattle, WA (US); Eric Jason Brandwine, Haymarket, VA (US); Nathan Bartholomew Thomas, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/476,532

(22) Filed: Sep. 3, 2014

(51) Int. Cl.
*G06F 21/00* (2013.01)
*H04L 29/06* (2006.01)
*G06F 21/60* (2013.01)

(52) U.S. Cl.
CPC ............ *H04L 63/10* (2013.01); *G06F 21/602* (2013.01)

(58) Field of Classification Search
CPC .................................. G06F 21/60; G06F 21/62
See application file for complete search history.

(56) References Cited

U.S. PATENT DOCUMENTS

| | | | |
|---|---|---|---|
| 4,218,582 A | 8/1980 | Hellman et al. | |
| 4,405,829 A | 9/1983 | Rivest et al. | |
| 5,643,085 A | 7/1997 | Aityan et al. | |
| 5,643,086 A | 7/1997 | Alcorn et al. | |
| 5,666,533 A * | 9/1997 | Horiguchi | G06F 9/4843 717/100 |
| 5,848,159 A | 12/1998 | Collins | |
| 5,867,578 A | 2/1999 | Brickell et al. | |
| 5,905,799 A | 5/1999 | Ganesan | |
| 6,071,190 A | 6/2000 | Weiss et al. | |
| 6,237,097 B1 | 5/2001 | Frankel et al. | |
| 6,364,796 B1 | 4/2002 | Nakamura et al. | |
| 6,631,354 B1 * | 10/2003 | Leymann | G06Q 10/10 705/7.26 |
| 6,722,986 B1 * | 4/2004 | Lyons | G06F 21/51 463/29 |
| 7,063,615 B2 | 6/2006 | Alcorn et al. | |
| 7,917,747 B2 | 3/2011 | Wolf | |
| 8,291,468 B1 | 10/2012 | Chickering | |

(Continued)

FOREIGN PATENT DOCUMENTS

WO   WO2008118648   10/2008

OTHER PUBLICATIONS

McKeen, Frank et al., "Innovative Instructions and Software Model for Isolated Execution", pp. 1-8, Intel Corporation, 2013.

(Continued)

*Primary Examiner* — Hadi Armouche
*Assistant Examiner* — Ali Shayanfar
(74) *Attorney, Agent, or Firm* — Davis Wright Tremaine LLP

(57) ABSTRACT

Methods and systems for instantiating an enclave according to a request, the enclave being instantiated at a determined location of a set of locations in a computing environment of a computing resource service provider hosting a set of computing resources. The enclave further being instantiated with executable code specified by a customer for processing network traffic in accordance with the executable code in a computing environment.

26 Claims, 12 Drawing Sheets

(56) References Cited

U.S. PATENT DOCUMENTS

| | | | |
|---|---|---|---|
| 8,407,584 B1 | 3/2013 | Broodman et al. | |
| 8,473,754 B2 | 6/2013 | Jones et al. | |
| 9,116,733 B2 | 8/2015 | Banga et al. | |
| 9,154,479 B1 | 10/2015 | Sethi | |
| 9,246,690 B1 | 1/2016 | Roth et al. | |
| 2002/0184046 A1 | 12/2002 | Kamada et al. | |
| 2004/0176068 A1* | 9/2004 | Paatero | G06F 21/10 455/410 |
| 2005/0091535 A1* | 4/2005 | Kavalam | G06F 8/62 726/4 |
| 2005/0278418 A1 | 12/2005 | Rathakrishnan et al. | |
| 2006/0161887 A1 | 7/2006 | Krishnaswamy et al. | |
| 2007/0050763 A1 | 3/2007 | Kagan et al. | |
| 2007/0153715 A1 | 7/2007 | Covington et al. | |
| 2007/0206799 A1* | 9/2007 | Wingert | G06F 21/10 380/285 |
| 2008/0216071 A1* | 9/2008 | Gidalov | G06F 21/14 718/1 |
| 2009/0112359 A1 | 4/2009 | Sanguinetti | |
| 2009/0313406 A1 | 12/2009 | Suh et al. | |
| 2010/0031325 A1 | 2/2010 | Maigne et al. | |
| 2010/0077473 A1 | 3/2010 | Ohta et al. | |
| 2012/0084838 A1* | 4/2012 | Inforzato | G06F 21/575 726/4 |
| 2012/0144457 A1 | 6/2012 | Counterman | |
| 2012/0159184 A1 | 6/2012 | Johnson et al. | |
| 2012/0192177 A1 | 7/2012 | Tsirkin | |
| 2013/0007239 A1 | 1/2013 | Agarwal et al. | |
| 2013/0117561 A1 | 5/2013 | Chawla et al. | |
| 2013/0151846 A1 | 6/2013 | Baumann et al. | |
| 2013/0174150 A1 | 7/2013 | Nakajima | |
| 2013/0174151 A1 | 7/2013 | Nakajima | |
| 2013/0179682 A1* | 7/2013 | Ramachandran | G06F 7/72 713/160 |
| 2013/0198853 A1 | 8/2013 | McKeen et al. | |
| 2013/0227286 A1 | 8/2013 | Brisson | |
| 2013/0246778 A1 | 9/2013 | Nikara et al. | |
| 2013/0282776 A1 | 10/2013 | Durrant et al. | |
| 2013/0312117 A1* | 11/2013 | Sapp, II | G06F 21/62 726/30 |
| 2013/0318343 A1 | 11/2013 | Bjarnason et al. | |
| 2013/0326504 A1 | 12/2013 | Tsirkin et al. | |
| 2014/0075496 A1 | 3/2014 | Prakash et al. | |
| 2014/0105393 A1 | 4/2014 | Kolesnikov | |
| 2014/0181359 A1 | 6/2014 | Zhang et al. | |
| 2014/0201841 A1* | 7/2014 | Deshpande | G06F 21/577 726/25 |
| 2014/0223543 A1 | 8/2014 | Jeansonne et al. | |
| 2014/0282935 A1* | 9/2014 | Lal | G06F 21/72 726/6 |
| 2014/0283098 A1 | 9/2014 | Phegade et al. | |
| 2014/0317686 A1 | 10/2014 | Vetillard | |
| 2014/0325515 A1 | 10/2014 | Salmela et al. | |
| 2014/0331317 A1 | 11/2014 | Singh | |
| 2014/0351583 A1* | 11/2014 | Bettale | H04W 12/04 713/159 |
| 2014/0373012 A1 | 12/2014 | Ylitalo et al. | |
| 2015/0007175 A1 | 1/2015 | Potlapally et al. | |
| 2015/0058629 A1 | 2/2015 | Yarvis et al. | |
| 2015/0127834 A1 | 5/2015 | Udupi et al. | |
| 2015/0143347 A1 | 5/2015 | Jones et al. | |
| 2015/0143374 A1 | 5/2015 | Banga et al. | |
| 2015/0143375 A1 | 5/2015 | Bruso et al. | |
| 2015/0199509 A1 | 7/2015 | Wille | |
| 2015/0200948 A1 | 7/2015 | Cairns et al. | |
| 2015/0244716 A1 | 8/2015 | Potlapally et al. | |
| 2015/0254451 A1* | 9/2015 | Doane | G06F 21/44 726/1 |
| 2015/0278528 A1* | 10/2015 | Xing | G06F 21/53 726/26 |
| 2016/0088009 A1 | 3/2016 | Gupta et al. | |

OTHER PUBLICATIONS

Intel SGX for Dummies—Part 1 (Intel SGX Design Objectives), pp. 1-4, Sep. 26, 2013, Intel Corporation.

Intel SGX for Dummies—Part 2, pp. 1-3, Jun. 2, 2014, Intel Corporation.

Intel SGX for Dummies—Part 3, pp. 1-3, Sep. 1, 2014, Intel Corporation.

Software Guard Extensions Programming Reference, 2010-2013, Intel Corporation.

Goldreich et al., "How to Play Any Mental Game," In Proceedings of the Nineteenth Annual ACM Symposium on Theory of Computing (STOC '87), Alfred V. Aho (Ed.). ACM, New York, NY, USA, pp. 218-229, 1987.

* cited by examiner

TRANSFORMS WITHIN SECURE EXECUTION ENVIRONMENTS

BACKGROUND

Modern computer systems place a high importance on maintaining data and application security. In a modern distributed and/or virtual computer system where a plurality of users, services, applications, virtual machines, controlling domains and hosts may have access to a computer system, maintaining data and application security may be a difficult problem. In a distributed and/or virtual computer system environment, for example, where the computer system resources may be provided by a computing resource service provider, customers may also wish for additional security for confidential data and/or privileged applications, safeguarding such data and/or applications from others and even from the computing resource service provider.

Encrypting data and/or applications may help ameliorate the security risks, but the owners of the data and/or applications often desire additional assurances. For example, customers may desire assurances that users, services, applications, virtual machines, controlling domains and hosts may not access confidential data that the customer has saved in a data storage repository on a computer system accessible by one or more users, services, applications, virtual machines, controlling domains or hosts. Without such assurances, customers may be reluctant to use the computer system services provided by the computing resource service provider and, likewise, such computing resource service providers may be apprehensive about hosting such sensitive data on hosts accessible to other customers. Furthermore, application of additional security measures for protecting sensitive data, such as additional and/or more computationally intensive encryption techniques, may be costly to both the customer and the computing resource service provider and may lead to decreased system performance, decreased resource availability, and a degradation in customer satisfaction.

BRIEF DESCRIPTION OF THE DRAWINGS

Various embodiments in accordance with the present disclosure will be described with reference to the drawings, in which.

DETAILED DESCRIPTION

Figure 1:
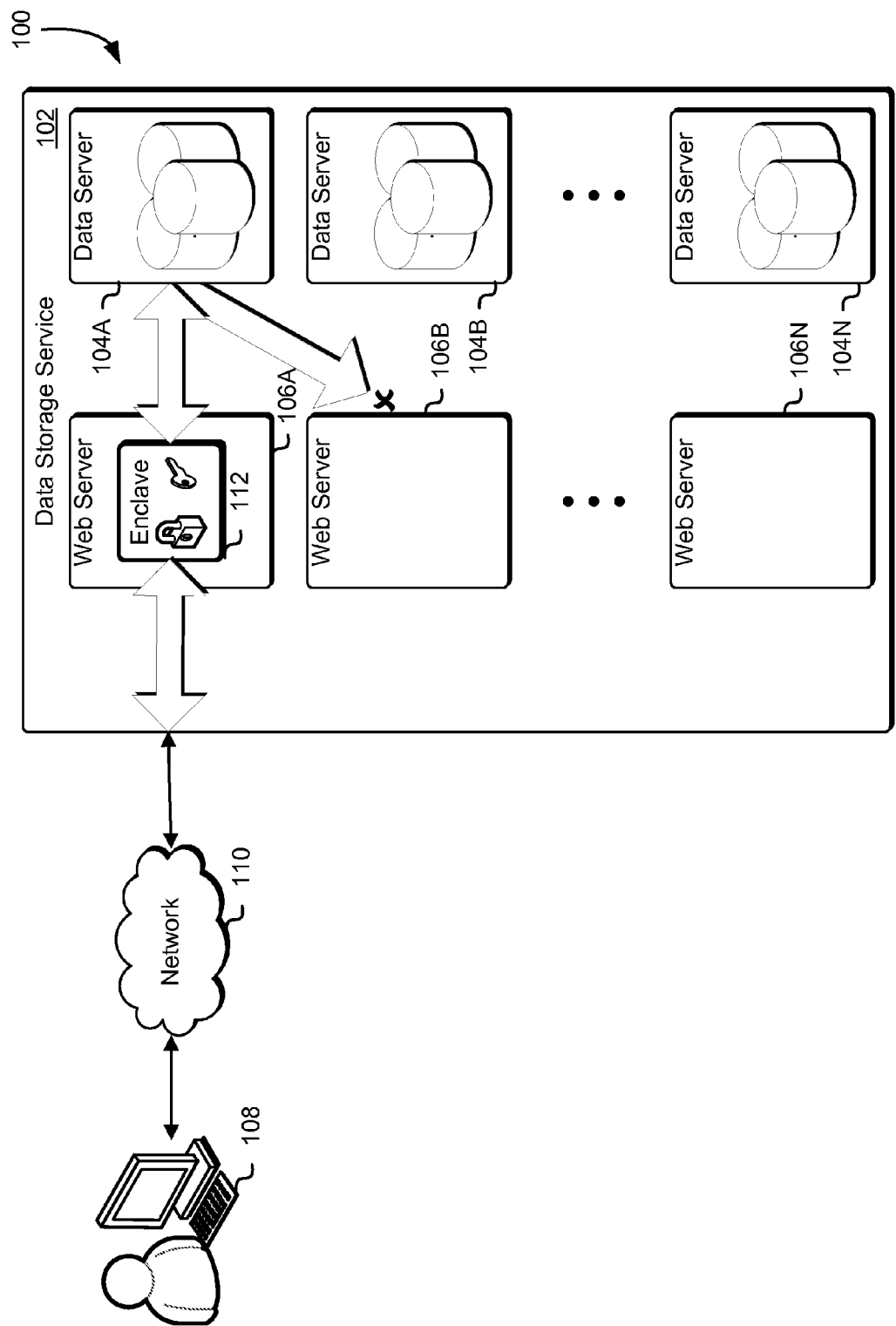
FIG. 1 illustrates an example of an enclave being used in an environment of a computing resource service provider in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems and methods for using a secured data region (enclave) to configure and control access to secured data of users of data storage services, such as those provided by a computing resource service provider. An enclave, which may also be described as a secure execution environment or a secure runtime environment, provides a hardware or software-secured region within a computer system where data may be stored and applications may be executed. Such data within the enclave may be made inaccessible outside the enclave, even to normally-trusted entities such as operating systems and privileged users. Hardware within the computer system ensures that data stored within an enclave and applications running within an enclave are not accessible to any entity outside of the enclave.

In some embodiments, an enclave may be configured using dedicated hardware which may implement a variety of security assurance methods including, but not limited to, microcode instructions on a central processing unit (CPU), a trusted platform module (TPM) or other such security assurance methods. When an enclave is created, the creator of the enclave may receive an access key through which access to the enclave is controlled, and any entity without proper credentials may be prevented from accessing confidential data and/or applications configured to access the confidential data by storing the data and/or applications in the enclave.

For example, a customer of a computing resource service provider may wish to submit such confidential data including, but not limited to financial data, market strategies, credit card information, user names, passwords, security keys and other such sensitive data, for storage in a data storage service of a computing resource service provider with assurances that the confidential data may not be intercepted, manipulated, or forged by any entity or only by entities trusted by the customer. Additionally or alternately, the customer may wish to retrieve such confidential data with the same assurances. Furthermore, the customer may additionally or alternately wish to perform processing on confidential data, such as validation of credit card information, user names, passwords, and security keys.

Depending on the embodiment, the enclave may be instantiated within a data storage service, virtual computer system service, or some other service, including, but not limited to, a service dedicated to enclave instances. In some embodiments, the instantiation or initialization may be made by a call from a software application to an application programming interface. In some of these embodiments, the call may be made at the direction of a customer, user, computing resource service provider, application, resource or other such entity. In one embodiment, the enclave may be instantiated in a data storage service and data submitted to the data storage service for storage may first pass through the enclave to encrypt the data, using a cryptographic key inaccessible to the service provider operating the data storage service, before the encrypted data is stored. Likewise, in at least another embodiment, the enclave may be instantiated in a data storage service and data retrieved from the data storage service may first pass through the enclave and encrypted (or decrypted and re-encrypted with a different key if the retrieved data is encrypted) before passing out of the enclave.

Similarly, executable instructions may be operating within the enclave and, for example, data may be retrieved from the data storage service, passed into the enclave, processed by the enclave, and a result output to the data storage service or trusted entity. As one example of such processing, the enclave may be executing "Forgot my Password" code and may be passed a username and an answer to a secret question from an application programming interface call initiated by a customer of the computing resource service provider. In this example, the username and secret question information may be encrypted within a data store of a data storage service using a public key held within the enclave, and to verify the answer to the secret question, code executing within the enclave may encrypt the username using the private key, retrieve data objects containing the encrypted username and secret answer of the customer, locate the encrypted answer in the data objects, decrypt the encrypted answer using a private key held within the enclave, and determine whether the decrypted answer matches the answer submitted by the customer. In the example, code executing within the enclave may respond to the requesting application programming interface or other appropriate application programming interface in various ways, including, but not limited to, responding that a match was or was not found, responding with the customer's password, or responding that the username could not be located in the data store.

Depending on various factors, such as network topology (e.g., the distance to the location in the computing resource service provider infrastructure to a data server hosting a data store of the data, etc.) of the computing resource service provider, the particular embodiment, or preferences of the customer of the computing resource service provider, any of the above functionality may be performed with an enclave instantiated on an application server, web server, or data server of the computing resource service provider in the data path in a distributed system. In at least one embodiment, the enclave of the present disclosure may be instantiated on a server of a virtual computer system service or other service similar in a similar manner.

Note that, unless otherwise specified, expressions regarding executable instructions (also referred to as code, applications, agents, etc.) performing one or more operations that instructions do not ordinarily perform unaided (e.g., transmission of data, calculations, and the like) denote that the instructions are being executed by a machine, thereby causing the machine to perform the specified operations.

FIG. 1 illustrates an aspect of an environment 100 in which various embodiments of the present disclosure may be practiced. As illustrated in FIG. 1, the environment 100 may include a data storage service 102 comprised of a plurality of data servers 104A-104N and a plurality of application or web servers 106 in a distributed computing system, the data storage service 102 being in communication with a user 108 through a network 110, such as the Internet or an Ethernet. The data storage service 102 may be a data storage service of a computing resource service provider, similar to the data storage service 1000 described in conjunction with FIG. 10. Likewise the computing resource service provider may be similar to the computing resource service provider 1102 described in conjunction with FIG. 11.

As illustrated, one or more of the application or web servers 106 of environment 1 are configured to host enclaves, such as enclave 112, however in some embodiments, the data servers 104A-104N may be additionally or alternately configured to host enclaves such as enclave 112. The application or web servers 106 and data servers 104A-104N may be any suitable computing devices similar to application server 1208, web server 1206, data store 1210 described in conjunction with FIG. 12.

The user 108 may be a customer or user of the customer's account, however the user 108 depicted in environment 1 need not be an individual, but may also include entities such as software modules, applications, services, virtual machines, software agents, cellular phones, tablet computers, other electronic and/or computing devices, and other such entities. The network 110 can include any appropriate network, including an intranet, the Internet, a cellular network, a local area network, a satellite network or any other such network and/or combination thereof.

As described herein, the enclave 112 may be thought of as a secure execution environment and may be facilitated by a hardware or software-secured region within a computer system where data may be stored and applications may be executed. The enclave 112 functionality may be provided to a host system, the environment 100 represented by the application or web server, by a specialized instruction set, such as the SGX or TPM instruction set, system microcode instructions or combinations of these and/or other such supported capabilities.

The enclave 112 may be provided by selecting one or more computer systems being configured to support the instantiation of enclaves and causing the enclave 112 to be instantiated. The one or more computer systems may support the instantiation of enclaves based on the hardware capabilities of the host system. For example, enclave functionality may be provided to a host system by a specialized instruction set, such as Intel® Software Guard eXtensions (SGX), a module such as a trusted platform module (TPM), system microcode or combinations of these and/or other such supported capabilities. As an example, the enclave 112 may be provided by selecting a computer system, such as from a web-based management console, from a plurality of computer systems configured to at least support enclave functionality.

Enclave functionality may include, but not be limited to, functionality for creating, deprovisioning, measuring (i.e., gathering metrics from), and populating enclaves. Enclave functionality may further include generating keys, sending and receiving data, and other such functionality. Access to such enclave functionality may be provided by a code library, an interface, web service, application programming interface (API), or other access methodology. In response to receiving a request through one of the methods of accessing enclave functionality, the computing resource service provider may provide that access to a user of a computer system as described herein. Note that the providers of enclave functionality, the types of enclave functionality, and the methods of providing access to enclave functionality described herein are for illustrative purposes and, as such, other providers of enclave functionality, types of enclave functionality and methods of providing access to enclave functionality as would be contemplated by a person having ordinary skill in the art may be considered as within the scope of the present disclosure.

In some embodiments, upon instantiation or upon request, the enclave 112 may generate a set of cryptographic keys for encrypting, decrypting, and performing integrity validation of data passing between the enclave 112 and another entity. In some cases, the set of cryptographic keys may be a key-pair based on an asymmetrical public-private cryptographic scheme, and the enclave 112 may provide the public key of the key-pair to a trusted entity and retain the private key of the key-pair securely within the enclave 112 where it may not be accessible to outside entities. Subsequently, the trusted entity may encrypt data and/or instructions using the public key and provide the encrypted data and/or instructions to the enclave 112, whereupon the enclave 112 may decrypt the data and/or instructions using the private key held within the enclave 112. Alternately or additionally, the enclave 112 may digitally sign results of processing or execution using the private key within the enclave 112 to provide assurance to the trusted entity the output has not been tampered with or forged.

In other embodiments usable in combination with other embodiments, the trusted entity may generate a set of cryptographic keys for encrypting, decrypting, and performing integrity validation of data passing between the enclave 112 and another entity. In some cases, the set of cryptographic keys may be a key-pair based on an asymmetrical public-private cryptographic scheme, and the trusted entity may provide the public key of the key-pair to the enclave 112 and retain the private key of the key pair. Subsequently, the enclave 112 may encrypt data and/or results of processing or execution using the public key before providing the data and/or results to the trusted entity, whereupon the trusted entity may decrypt the encrypted data and/or results using its private key. Alternately or additionally, the trusted entity may digitally sign data and/or instructions provided to the enclave 112 using the private key of the trusted entity to provide assurance to the enclave 112 that the data and/or instructions have not been tampered with or forged. Alternately or additionally, in a technique referred to herein as enveloping, the enclave 112 may provide the trusted entity with a session key encrypted using the public key of the trusted entity. Subsequently, the enclave 112 may provide encrypted data and/or results of processing of execution, whereupon the trusted entity may decrypt the encrypted data and/or results using the session key.

A computer system for hosting enclaves may be a distributed system with a plurality of hosts, may be a single system with a plurality of virtual machine instances, may be a networked combination of such systems, or may be a combination of these and/or other such systems. A computer system may provide access to a plurality of users, customers, modules, applications, services, processes, programs, operating systems, controlling domains and/or other such computer system entities. Some of the access provided by the computer system to these entities may include providing access to confidential data and/or privileged applications. A computer system may also provide a plurality of data storage regions to the customer, including, but not limited to, memory, disk storage, virtual memory, virtual disk storage and other such storage regions. Consequently, some of the data storage regions provided by the computer system may be configured to store confidential and/or otherwise significant data.

A computer system for hosting enclaves may also run applications, processes, services, modules and/or other such operation entities configured to access and/or manipulate such confidential data. A computer system may also run applications from a computing resource service provider that may utilize privileged code or perform operations on confidential data. Additionally, a computer system may include operating systems, privileged users, controlling domains and/or other such entities which may have full access to the computer system resources, including, but not limited to, direct access to computer memory, CPUs, data storage, networks and/or other such computer system resources. A customer may wish to secure confidential data, and any applications configured to access such confidential data, by preventing access to the data and/or applications by entities without proper credentials, even those entities that are typically trusted entities such as operating systems, privileged users, controlling domains and/or other such normally privileged entities. Similarly, a computing resource service provider may also wish to secure such confidential data and any applications configured to access the confidential data by preventing access to the confidential data and applications by any entity without proper credentials.

A host computer system of a computing resource service provider may be configured to support a virtualization layer to provide computational resources upon which one or more virtual machines may operate. The virtualization layer may manage memory and processor scheduling for all virtual machines operating on the host computer system. The virtualization layer may also launch and/or manage a control domain, also known as a privileged domain, which is a virtual machine having direct access to the hardware of the host computer system. The virtualization layer may be any device, software or firmware, used for providing a virtual computing platform for the virtual machines. The virtual machines of the virtualization layer may be provided to customers of the computing resource service provider, and the customers may run an operating system and/or applications on the virtual machines of the customer. An example of a virtualization layer includes, but is not limited to, a hypervisor.

An entity, such as one or more of a service or operating system running on the host computer system, the controlling domain, a guest domain running a virtual machine instance, or a service or operating system of the controlling domain or a guest domain, may provide an interface to enclave functionality. A user, client, service, module or other such entity with access to a virtual machine instance on the host computer system may use that interface to the enclave functionality to, for example, create an enclave, populate the enclave, obtain keys and/or other such enclave operations.

In an illustrative example, a host computer system may provide enclave functionality, as noted, via the SGX instruction set that may be enabled on the CPU of the host computer system, although the scope of the present disclosure extends to other enclaves. The physical hardware of the host computer system may be any device or equipment configured to execute instructions for performing data computation, manipulation or storage tasks, such as a computer or server. The host computer system may be equipped with one or more processors, including, but not limited to, a CPU, a graphics processing unit (GPU), and a digital signal processor (DSP). The host computer system may further include memory, including static and dynamic volatile memory, and non-volatile persistent storage such as optical and magnetic storage disks, tape, and flash memory. The host computer system may also include additional hardware such as buses, input/output ports, and networking equipment compliant with any handshaking, communications or data transfer protocol.

In some embodiments, the enclave functionality may be provided as an application, process, module or other such entity, and may, in some cases, be implemented as a single instance on a host computer system providing enclave functionality for one or more virtual machine instances. An application, process, module or some other such entity configured to provide enclave functionality may also operate on a remote machine and/or may provide enclave functionality in a distributed and/or hierarchical manner. Said application, process, module or other such entity may further be configured to start automatically when a host machine and/or virtual machine is started, or, alternately, may be started as needed (e.g., when a client entity requests access to the enclave functionality).

As described herein, a computing resource service provider may provide a variety of services to its customers, and its customers may communicate with the computing resource service provider through an interface, which may be a web page or other type of customer interface. Each service of the services provided by the computing resource service provider may have its own interface and subsets of the services may have corresponding individual interfaces in addition to or as an alternative to a common interface. A customer may communicate with the computing resource service provider through a network, such as the Internet, intranet, Internet service provider (ISP) and/or other such network.

The computing resource service provider may also provide various computing resources and services to its customers, individually or in combination with other resources and services, and the computing resource service provider may further provide those services to the customer through a distributed computing environment as described herein. The services provided by the computing resource service provider may include services such as virtual computer system services, block-level data storage services, cryptography services, on-demand data storage services, notification services, authentication services, policy management services, task services, archival data storage services and/or other such services. Not all embodiments described herein include all the services described, and additional services may be provided in addition to or as an alternative to services explicitly described herein.

Services provided by a computing resource service provider may include one or more interfaces that enable a customer to submit requests, for example, through appropriately configured API calls, to the various services. In addition, each of the services may include one or more service interfaces that enable the services to communicate with or access each other (e.g., to enable a virtual computer system of the virtual computer system service to store data in or retrieve data from an on-demand data storage service and/or access one or more block-level data storage devices provided by a block-level data storage service). Each of the service interfaces may also provide secured and/or protected access to each other through the use of encryption keys and/or other such secured and/or protected access methods, thereby enabling secure and/or protected access between them. Collections of services operating in concert on a distributed computer system may have a single front-end interface and/or multiple interfaces between the elements of the distributed computer system.

A computing resource service provider may provide a virtual computer system service that may be a collection of computer resources configured to instantiate virtual machine instances on behalf of the customer. The customer may interact with the virtual computer system service to provision, place and operate virtual machine instances that are instantiated on host computer systems operated by the computing resource service provider. The virtual machine instance may be used for various purposes, such as to operate as servers supporting a web site, to operate business applications, or, generally, to provide compute power to the customer. Other applications for the virtual machine instances may be to support database applications, electronic commerce (e-commerce) applications, business applications and/or other applications.

A virtual computer system service may be used by a computing resource service provider for providing computer system resources for customers. The virtual computer system service may provide such computer system resources by instantiating one or more virtual machine instances on physical hardware. The physical hardware may include physical hosts which may include any device or equipment configured to execute instructions for performing data computation, manipulation or storage tasks, such as a computer or server. A physical host may be equipped with any needed processing capability including, but not limited to, one or more processors, such as a CPU, GPU, DSP, memory, storage devices, buses, input/output ports, and networking equipment. The physical hardware may also support specialized instructions such as, for example, SGX instructions, TPM instructions or the like.

As noted, a host computer system may provide enclave functionality through instructions made to a processor configured to support a secure execution environment, such as SGX or TPM, or through a hypervisor. The enclave functionality may be provided to various other services running on the host computer system. For example, a virtual computer system service of a computing resource service provider running on the host computer system may provide enclave functionality to a virtual machine instance running under the control of the virtual computer system service. Similarly, other services including, but not limited to, block-level data storage services, cryptography services, on-demand data storage services, archival storage services, notification services, authentication services, policy management services, billing services, task services, and/or other such services may also access the enclave functionality to provide that functionality to resources associated with those services. Enclave functionality may also be provided to one or more customers of the computing resource service provider. For example, a user, customer, service, module or other such entity with access to a service and/or access to the resources served by that service may use enclave functionality to further secure data and/or applications associated with that service. In an illustrative example, a virtual computer system service as described herein and/or a virtual machine instance associated with that virtual computer system service may use the enclave functionality to create an enclave, populate the enclave with data and/or applications, obtain keys for decrypting results from the enclave, start the applications within the enclave and receive updates.

A variety of techniques may be utilized to provide enclave functionality to one or more services within a computing resource service provider and/or to one or more customers of the computing resource service provider. For example, in some embodiments, in response to a request to create an enclave from a customer, the enclave 112 may be created and may be initially populated with executable code which may be configured as an enclave agent to provide access to enclave functionality. The enclave agent may be an application, module, process and/or the like which may be configured to instantiate other applications within the enclave 112, provide security keys from the host computer system processor, may be configured to locate other resources within the computer system, or may be configured to perform other such functionality.

An enclave agent may be installed, instantiated or launched on a computer system (e.g., within the enclave 112 on the computer system) by the computer system or a different computer system. In some embodiments, the enclave agent may be installed, instantiated or launched on the computer system in response to a request by a customer, user, service, module, different computer or other such entity. In some embodiments, the enclave agent may be trusted code that may be verified by the computing resource service provider, the customer, certain third parties, or some other such entity. The enclave agent may also be configured to provide one or more other measurements of the contents of the enclave 112 in order to verify the integrity of the enclave 112 and/or applications executing within the enclave 112 to the customer, the computing resource service provider, certain third parties or some other such entity.

The one or more measurements may indicate a current state of the enclave 112 and/or contents within the enclave 112. The one or more measurements may be evaluated within the enclave 112 or may be sent outside the enclave 112. Enclaves may be configured such that measurements are performed entirely within a secure portion of the processor and may also be configured so that the measurements are signed by secret material provided by the processor, such as, for example, microcode running on the processor or a private key. In this way, measurements may be verified as correct by trusted users using the functionality provided with the enclave. Measurements may be verified by, for example, an application programming interface which may provide information usable to determine the state of a processor.

The measurements may be based at least in part on measurements obtained from host computer system hardware, such as, for example, measurements obtained by utilizing SGX instructions supported by a processor of the host computer system. In order to obtain the measurement, the enclave 112 may first need to be paused or frozen by halting the execution of applications running within the enclave 112 and/or by placing the applications in a certain determined state. By pausing and/or freezing the applications and/or placing the applications in a determined state, external verification that the enclave 112 and its contents have not been tampered with may be made by comparing the measurements with predicted values. Measurements may, in some embodiments, include verification and/or validation that the measurements were performed by a trusted, verified and/or validated source. For example, measurements performed by a processor executing the appropriate SGX instructions may be digitally signed by the processor and thereby verified as coming from the particular processor. Likewise, measurements coming from a TPM may include a similar verifiable signature with the measurements as an assurance that the measurements were performed by the TPM and/or a process running thereon.

In some embodiments, the enclave agent may be configured to locate and/or instantiate a bootloader application within the enclave 112, which may, in turn, be configured to locate and/or instantiate other applications and/or data to be installed within the enclave 112. A bootloader as used herein is an application, process, module or other such entity that may be configured to locate and instantiate executable code (i.e., bootstrap code) and/or data within a computer system. The enclave agent may first receive the bootloader, may then decrypt the bootloader (if it had been previously encrypted) and may finally verify the bootloader using one or more measurements of the bootloader. The enclave agent may be able to provide measurements of the bootloader by, after it has been instantiated within the enclave 112, pausing and/or otherwise freezing the state of the enclave 112 and obtaining one or more measurements of the enclave 112 using certain instructions of the host processor. This measurement, as with other measurements as noted, may be verified within the enclave 112 or may be sent outside the enclave 112 in encrypted form for storage or validation. In some embodiments, the enclave agent may implement the bootloader functionality itself, whereas in other embodiments the bootloader functionality may be placed within the enclave 112 upon instantiation.

The applications and/or data to be installed within the enclave 112 by the bootloader may include any applications and/or data as may be required by the customer. In some embodiments, the customers require functionality to store a collection of cryptographic keys within the enclave 112 relating to access of certain stored encrypted data stored. The bootloader may instantiate an application to receive requests for new keys (i.e., bootstrap code for provisioning keying materials), store keys within a file, remove keys from the file and provide copies of those cryptographic keys to authorized users. In some embodiments, the bootloader may also instantiate a file of preloaded keys. The encrypted key may be stored within the enclave 112 and only sent outside the enclave 112 using an encryption schema that may only be decrypted by a trusted user with an enclave access key; in this manner, the key may remain safe from interception by any other entity with access to the computer system, thereby ensuring the security of the certain encrypted data. The bootloader may also install other applications and data within the enclave 112, including, but not limited to, entire virtual computer system instances. For example, in some embodiments, the enclave 112 may be created with an entire virtual machine instance preloaded and configured to run.

In some embodiments, enclaves of a computing resource service provider may be configured with bootstrap code for instantiating other enclaves. In these embodiments, a request may be made to an application programming interface to an enclave 112 to instantiate one or more additional enclaves on one or more additional servers. An example of how this embodiment may be used may include, but not be limited to, providing a method by which a computing resource service provider to quickly provide enclaves to newly-created or re-booted host machines by submitting a request to the application programming interface to instantiate one or more enclaves for newly-created or rebooted host machines.

Applications and/or data installed in the enclave 112 may include applications to provide access to and/or process other types of confidential data. For example, a payment processing application running as a web service on a host computer of a computing resource service provider may be executed in the enclave 112 by first measuring the application, encrypting the application, injecting the application into the enclave 112, and finally decrypting and running the application within the enclave 112. Note that the methods of providing access to enclave functionality described herein are for illustrative purposes and, as such, other methods of providing access to enclave functionality as would be contemplated by a person having ordinary skill in the art may be considered as within the scope of the present disclosure.

The enclave 112 may be configured to instantiate enclaves in a data path of a distributed system such that the data is processed by application code executing within the enclave 112. The enclave 112 may be located anywhere within the data path, including, but not limited to, the data servers 104A-104N, web servers 106A-106N or application server of the data storage service 102 providing or obtaining the data. The enclave 112 of the present disclosure may be used to control the data flowing into or out of a server and/or may perform authorization logic for a customer of a computing resource service provider without confidential data, such as unencrypted passwords or decryption keys, being made available to the computing resource service provider. Entities outside of the enclave 112, including, but not limited to the operating system, other applications and/or users, may not access the data stored in the enclave 112, applications processing within the enclave 112 so long as such data resides within the enclave 112. In some embodiments, the data and application code may be provided to the enclave 112 in encrypted form. In some embodiments, data and/or results of the processing of applications may be output from the enclave 112 in encrypted form. The enclave 112 may receive stored data, for example, from the data server 104A of the data storage service 102, process the data according to a particular request from a user, customer, service, application or other such entity, utilizing executable instructions running within the enclave 112. The stored data may be received in encrypted form, and the processing may include decrypting the stored data using a decryption key held within the enclave 112. The enclave 112 may determine whether to provide the data or a subset of the data to the requestor and, based on the determination, may or may not transform the data into another form before providing the data to the requestor. The transformation of the data may entail encrypting the data with the same key as it may have been encrypted with before the enclave 112 received it, encrypting or re-encrypting with a different key, and/or some other transformation of the data, such as wholly or partially-filtering or obfuscating portions of the data.

Furthermore, in some embodiments of the present disclosure, certain data may only be retrieved and/or stored by passing the data through an enclave. For example, as illustrated in FIG. 1, the certain data from data server 104A may only be configured to pass through the enclave 112 on a particular server, such as the web server 106A, configured to process the certain data, and the data may not be permitted to pass through a server without an enclave configured to process the certain data, such as the web server 106B. Or, it may be that the certain data is configured in such a way (e.g., encrypted with a key held within the enclave 112) such that retrieval of the certain data by another server without the properly-configured enclave 112, such as the web server 106B may be unable to decipher the data. Note that in some cases, data expected to pass through the enclave 112 may be stored in a data store of the data server 104 in conjunction with data that need not pass through the enclave 112. In such a case, the data that does not need to pass through the enclave 112 may be routed to other servers 106B-106N or may pass through the web server 106A or may pass through the enclave 112 without being processed.

In some embodiments, a customer may provide an enclave 112 of the present disclosure with data to be stored in a data store, such as a data store on the data server 104A of the data storage service 102. In some of these embodiments, the customer may request that the enclave 112 encrypt the data before storing the data. In some of these embodiments usable in combination with other embodiments, the enclave 112 may encrypt the data by default before storing the data. In a variation of such an embodiment, the customer may ensure that the data is encrypted by the enclave 112 by specifying, for example through an application programming interface call, that the data should pass through an enclave 112 configured for encrypting the data in this manner before being stored to the data store. In another variation of said embodiments, the enclave 112 may encrypt data by default unless the customer specifies that the data not be encrypted before storing in the data store.

Figure 11:
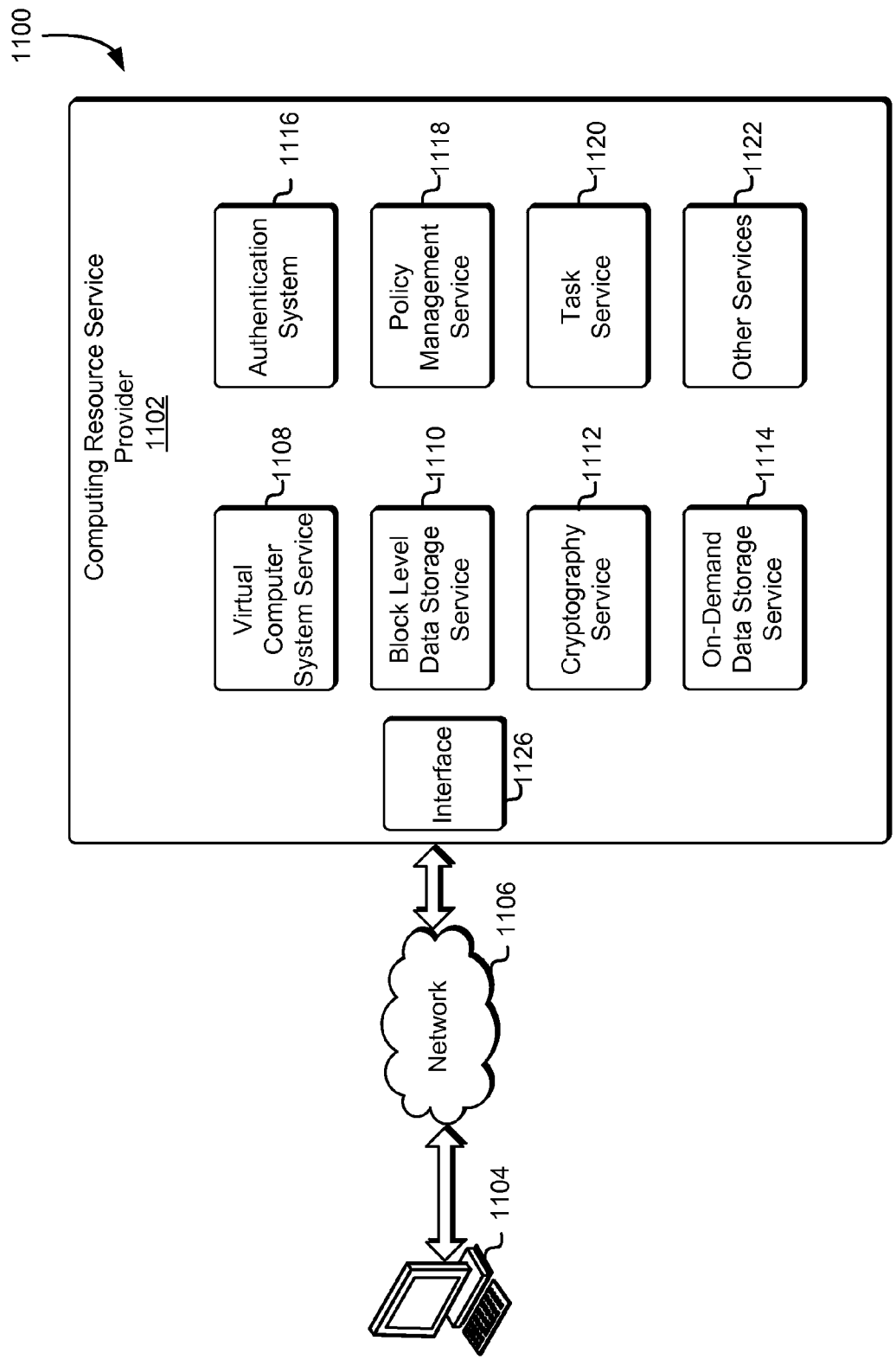
FIG. 11 illustrates an example of a customer connected to a computing resource service provider.

Note that the enclaves of the present disclosure may be used as described herein for other services than data storage services, such as services described in conjunction with FIG. 11. For example, enclaves as described herein may provide the described functionality for virtual computer system services, block-level data storage services, cryptography services, on-demand data storage services, notification services, authentication services, policy management services, task services, billing services, archival data storage services and/or any other services as would be contemplated by a person having ordinary skill in the art may be considered as within the scope of the present disclosure.

In some embodiments, the customer may have a private key for decrypting stored data in a data store of the data storage service 102, and in such cases the enclave 112 passes the encrypted data to the customer. In other embodiments, the enclave 112 has the private key and reads from the data store must pass through the enclave 112 for decryption, and, in some embodiments, re-encryption. In some embodiments, both the customer and the enclave 112 may have the private key and the customer may request the ciphertext from the data storage service 102 (i.e., request to read the data directly) in order to verify that data is indeed being encrypted and that the key is valid (the same as the enclave 112), by decrypting the ciphertext using the private key.

The location of data being transformed and/or the location to where the transformed data is being provided may influence the location where the enclave 112 is instantiated. For example, it may be desirable to instantiate the enclave 112 on the data server 104A of the data storage service 102 if the data that is being transformed by the enclave 112 is being retrieved from the data server 104A or if the data is being transformed by the enclave 112 and subsequently provided to the data server 104A of the data storage instance. Alternately, it may be desirable to instantiate the enclave 112 on an application server or the web server 106A of the data storage service 102 that may be providing the data to be transformed to the enclave 112 or may be receiving the transformed data from the enclave 112. Similarly, it may be desirable for various reasons to instantiate the enclave 112 in an instance separate from or a different server from an instance of a requestor and an instance containing data being requested. Note that the enclave 112 of the present disclosure is not limited to instantiation on servers of the data storage service 102, and may alternately be instantiated with other services. In at least one embodiment, the enclave 112 may be instantiated on a server of a virtual computing system service. In some of those embodiments, the virtual machine instance may be obtaining and providing data to the data storage service 102 and the enclave 112 may be providing similar functionality as the embodiments herein of the enclave 112 being instantiated at the data storage service 102. In at least another embodiment, the enclave 112 may be instantiated in conjunction within a provider-hosted isolated network. Reasons for determining where to instantiate the enclave 112 in the data path may be at least partially based on network topology (e.g., the distance, measured in hops or geometrically, to the location in the computing resource service provider infrastructure to the data server 104A hosting a data store of the data, etc.), network latency, geography, security, hardware support of secure environment instructions (e.g., SGX, TPM, etc.), fault tolerance, and/or other reasons. For example, the particular web server 106A of the data storage service 102 may require data in the manner described in the present disclosure, and the enclave 112 may be instantiated on a particular data server 104A located physically proximate to or having the lowest network latency to the particular web server 106A or a latency that is within a range specified as acceptable. As another example, the enclave 112 may be instantiated on a server or servers with high fault tolerance; e.g., instantiating the enclave 112 at a location where, if a hard drive fails on the server or servers, the enclave 112 instance may be minimally affected.

An enclave 112 of the present disclosure may provide data loss prevention functionality by using an enclave 112. For example, customers of a computing resource service provider may have data that may be viewable only to certain trusted entities, or may be viewable by no entity except for the enclave 112, or may be viewable only to trusted entities when first stored with the data storage service 102 and viewable by no one except the enclave 112 thereafter. As an example, a customer of a computing resource service provider may utilize the computing resource service provider for hosting a website of an online marketplace. In this example, a client of the customer may make a purchase from the customer website and may enter information corresponding to the credit card of the client. In an embodiment of the present disclosure, the information corresponding to the credit card may be passed through an enclave 112 instantiated on a server of the data storage service 102, which may then process the transaction securely within the enclave 112. Additionally, in some embodiments, the enclave 112 may further process the credit card information by at least encrypting the credit card information of the client and storing the encrypted credit card information in a data store of the data storage service 102 of the computing resource service provider. Thereafter, if the client of the customer wishes to use the same credit card for a future purchase, the encrypted credit card information may be retrieved from the data store by the enclave 112 and decrypted within the enclave 112. The enclave 112 may present, for example, the last four digits of the unencrypted credit card number (e.g., "**  ** 1234") to the client for confirmation of the credit card and, upon confirmation by the client, the transaction may be securely processed within the enclave 112 without any user, service, customer, the computing resource service provider, or even the client having access to the unencrypted credit card information beyond the last four digits of the credit card. Thus, data loss of the credit card information, such as to identity thieves, may be avoided. Note that the aforementioned process may be performed by a single enclave 112 or multiple enclaves.

In another of a multitude of variations, a customer may be a governmental institution with confidential documents, logs, and/or other sensitive data. Employees of the governmental institution may have specified clearance levels that allow viewing of certain documents, disallows viewing of other documents, and/or viewing of certain other documents in one or more wholly or partially-filtered or obfuscated forms. The confidential documents, logs, and/or other sensitive data may be securely stored with the data storage service 102 of the computing resource service provider in a similar manner to that described above, but may be additionally stored with a policy or some other data indicating the level of viewability of the confidential documents, logs, and/or other sensitive data according to a clearance level of a prospective viewer. For example, a 16-bit code may be linked to a document or portions of the document, the code indicating that the document or the portions may only be viewable with "Security Clearance Level X." In such an example, a prospective viewer may, once the prospective viewer is authenticated and the clearance level of the prospective viewer is determined, make a request to view the confidential documents, logs, and/or other sensitive data. In response the enclave 112 may retrieve encrypted confidential documents, logs, and/or other sensitive data from the data store by the enclave 112 and decrypted within the enclave 112. In this example, the enclave 112 may compare the clearance level of the prospective viewer with the viewing policy corresponding to the confidential documents, logs, and/or other sensitive data and, depending on the clearance level and viewing policy corresponding to the confidential documents, logs, and/or other sensitive data, may allow the prospective viewer to view the confidential documents, logs, and/or other sensitive data, validate the confidential documents, logs, and/or other sensitive data, deny the prospective viewer from viewing the confidential documents, logs, and/or other sensitive data, or provide the prospective viewer with wholly or partially-filtered or obfuscated copies of the confidential documents, logs, and/or other sensitive data. Thus data loss of confidential documents, logs, and/or other sensitive data may be diminished by preventing untrusted entities from accessing sensitive data.

In at least one embodiment, an enclave 112 may be instantiated within a provider-hosted isolated network. An isolated network may be a distributed network of virtual and/or physical machines that uses private network addresses (e.g., Internet Protocol (IP) addresses) and that, unless otherwise configured, is inaccessible from outside networks, such as the Internet. Access to outside networks may be made possible by enabling a network interface (e.g., a gateway router) to provide access to outside networks to the isolated network and/or provide access to isolated network to outside networks. However, customers of isolated networks may desire assurances that confidential data may not pass from the isolated network to the outside networks through the network interface and/or assurances that untrusted applications or data may pass into the isolated network from the network interface. Hence, an enclave 112 of the present embodiment may be instantiated within the isolated network between the network interface and outside networks and applications and data passing to or from the isolated network may be required to pass through the enclave 112, whereupon application code executing within the enclave 112 may perform operations and/or transform the data before passing out of the enclave 112. In an example of such an embodiment, the enclave 112 may contain or have access to transport layer security or secure sockets layer private keys of the isolated network and utilize the private keys to inspect secure sockets layer traffic passing through the network interface.

In other embodiments, executable code of customers may be executing within enclave 112 instances on servers of the data storage service 102 of a computing resource service provider. It may be desirable to also protect executable code of the computing resource service provider within one or more enclave 112 instances separate from the enclave 112 instances of the customers. In this manner, data of an executable code of the computing resource service provider may be protected from unauthorized access by running applications of customers, and, in turn, the executable code of the customers may be protected from being accessed by the computing resource service provider.

As depicted in FIG. 1, the user 108 may provide data to the data storage service 12 through the network 110 for storage in one or more of the plurality of the data servers 104A-104N. The data may be submitted to the application or web servers 106A-106N, whereupon the data passes through the enclave 112 instantiated on the data storage service 12.

The enclave 112 may be instantiated on the particular server in the data path for any number of reasons, including, but not limited to, network topology, network latency, geography, security, hardware support of secure environment instructions (e.g., SGX, TPM, etc.), fault tolerance, and/or other reasons. For example, the enclave 112 may have been instantiated on the particular web server of the application or web servers 106A-106N illustrated in FIG. 1 because network latency between the particular data server containing the relevant data and the particular web server was the lowest. Or, it may be that the enclave 112 was instantiated on the particular web server 104A of the application or web servers 106A-106N because it was a server with hardware supporting a secure execution environment. Although not depicted in the environment 100, as noted herein, the enclave 112 may instead be instantiated on one of the data servers 104A-104N or a different server, if preferred.

In some embodiments, a particular enclave of the present disclosure may be instantiated or re-instantiated on another server or computer system than the server or computer system the particular enclave was originally instantiated on. For example, in the environment 100, the customer data or the data store hosting the customer data may be transferred to a different data server of the data servers 104B-104N. In such an example, a data storage service may cause the enclave to be re-instantiated on a server closer to the new data location. Likewise, if server hosting customer data is taken offline or moved, the enclave may be instantiated at a location near an alternate data server hosting the customer data. Similarly, if a new data server is brought online to host the customer data, the enclave may be instantiated at a location near the new data server. In other words, the location of the instantiation of an enclave may be determined based on a change to a set of computing resources hosted by a computing resource service provider.

In some embodiments, an entity authorized to receive or request data from code executing in the enclave and/or configure the code in the enclave may have different authorization than an entity authorized to store the data in the data store. For example, an entity acting as a consultant, technical contractor, or an auditor may have access to view the data and/or configure the code within the enclave, but may have different permissions to an entity with permissions to store and retrieve data from the data store. In some embodiments, different entities may have different permissions to the enclave. As one example of this embodiment, a data loss prevention administrator may have certain authorization to the enclave different from an administrator of the enclave itself.

In some embodiments, the enclave may have executable code able to provide keying material to other copies of itself instantiated by the computing resource service provider. In this embodiment, an initial enclave may be launched, keys for the initial enclave may be generated, and, thereafter, additional enclaves may be launched by the computing resource service provider and the additional enclaves may be keyed based off of the keys of the initial enclave. That is, an additional enclave may provide an attestation to the initial enclave, and based at least in part on the attestation, the initial enclave may encrypt a key that is to be shared with the additional enclave. In this manner, additional enclaves may be provisioned to process the customer data without a customer having to run an explicit keying service.

In some embodiments, requests to retrieve data may first pass through the enclave. In these embodiments, code executing within the enclave may process the requests to determine whether the requestor has permissions to access the data. Similarly, in some embodiments, requests to store data may pass the request and/or the data to be stored through the enclave before storage. Again, the code within the enclave may process the request in part to determine whether the requestor has sufficient permissions to cause the request to be fulfilled. Likewise, a computing resource service provider hosting the data may respond to a request to retrieve the data or respond to a request to store the data by also passing data through the enclave. Among other methods, such as filtering, encrypting, re-encrypting and other such transformations, these embodiments access to data may be controlled by the code executing within the enclave. As an example of a response of a computing resource service provider providing a response to a requestor, the computing resource service provider may provide a response, such as, "Data successfully stored," or "Processing the request." Such responses may or may not be encrypted or digitally signed (i.e., transformed) by code executing within the enclave before being provided to the requestor.

Figure 2:
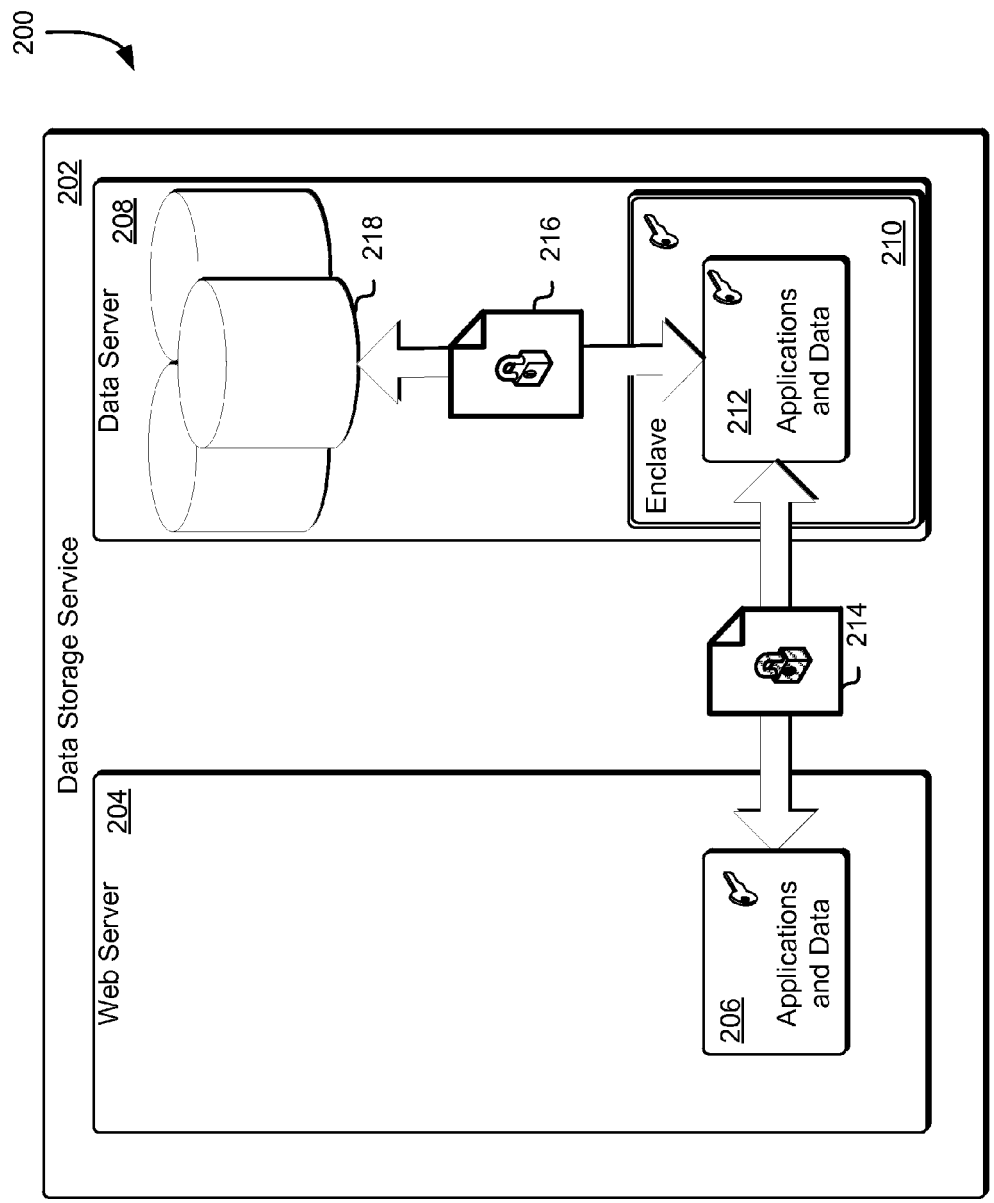
FIG. 2 illustrates an example of a data storage service with an enclave for transforms instantiated on a data server in accordance with at least one embodiment.

FIG. 2 illustrates an aspect of an environment 200 in which various embodiments of the present disclosure may be practiced. Specifically, FIG. 2 depicts an environment 200 of an example data storage service 202 having a web server 204 hosting applications and data and a data server 208, the data server 208 being configured to support secure execution environments for an enclave 210 to host secure applications and data. As noted, the data storage service 202 may be services provided by a computing resource service provider for providing data storage services to customer, as the data storage service 1000 described in conjunction with FIG. 10. Also, as noted, the web server 204 and data server 208 may be any suitable computing devices similar to application server 1208, web server 1206, data store 1210 described in conjunction with FIG. 12.

An application of the present embodiment, as illustrated in environment 200, could be where an application 206 of the applications and data of the web server 204 requests to store data 214 at the data server 208. The request may be made by making an application programming interface call or some other acceptable method of making such a request as would be known by a person having ordinary skill in the art, and may arrive in various forms, including, but not limited to, plain text, ciphertext, or may be digitally signed with a key held by the web server 204 or other trusted entity of the enclave 210. The request and data 214 may be received by an application 212 of the applications and data running on the enclave 210 of the data server 208. The enclave 210 may hold a private key of a public-private cryptography scheme which it may have generated and provided the public key of the public-private cryptography scheme to the application 206 of the web server 204, and the received data 214 may have been encrypted by the application 206 using the public key. After determining that the request is appropriate (e.g., decrypting the ciphertext if the request was encrypted, verifying that a digital signature accompanying the request was authentic, etc.), the application 212 of the enclave 210 may provide the encrypted data 216 to a data store 218 of the data server 208 (if the data 214 was encrypted) or, if the data 214 was received encrypted, may encrypt the data 214 using a key held within the enclave 210. Alternately or additionally, if the data 214 was received encrypted, the enclave 210 may decrypt the data 214 using a private key held within the enclave 210 and re-encrypt the data 214 using a different key held within the enclave 210 before providing the encrypted data 216 to the data store 218. In this way, additional security may exist for the data 216 encrypted in the data server 208, as it may not be decrypted even if the encryption by the application 206 of the web server 204 were to be compromised.

In a similar manner, the application 206 of the applications and data of the web server 204 may request to receive confidential data 214 from the data server 208. Note that the application 206 of the applications and data of the web server 204 may be the same or a different application than the application 206 described above as requesting the storage of the data 214 and the confidential data 214 requested need not necessarily be the same data 214 as stored above. Also, as with the request for storing the data 214, the request to retrieve the data 214 may be made through an application programming interface or other mode, and may be encrypted, in plain text, or digitally signed. The application 212 of the applications and data of the enclave 210, which may be the same or different application than the application 212 that provided the data 214 to the data store 218, may authenticate the request. The application 212 of the enclave 210 may retrieve data 216 from the data server 208. As illustrated, the data 216 being retrieved may be encrypted. The application 212 running in the enclave 210 may decrypt the encrypted data 216 and determine whether to provide the application 206 of the web server 204 with the data or a portion of the data 216. The data or portion of the data 216 may be re-encrypted using a public key of a public-private cryptography scheme and may then provide the encrypted data or portion of the data 214 to the application 206 of the web server 204 having a private key for decrypting the data or portion of the data 214. In some embodiments, rather than encrypting with a public key, the data or portion of the data 214 may be encrypted using a symmetrical session key wherein the enclave 210 and the application 206 of the web server 204 have copies of the session key provided by enveloping, as described herein. In some embodiments, the data or portion of the data 214 may not necessarily be encrypted but may instead be provided to the application 206 of the web server 204 according to the privileges of the user or application 206 requesting the data 214, such as in a wholly or partially-filtered or obfuscated form or only providing the portion of the data 214 that the user or application 206 has sufficient privileges to request.

Figure 3:
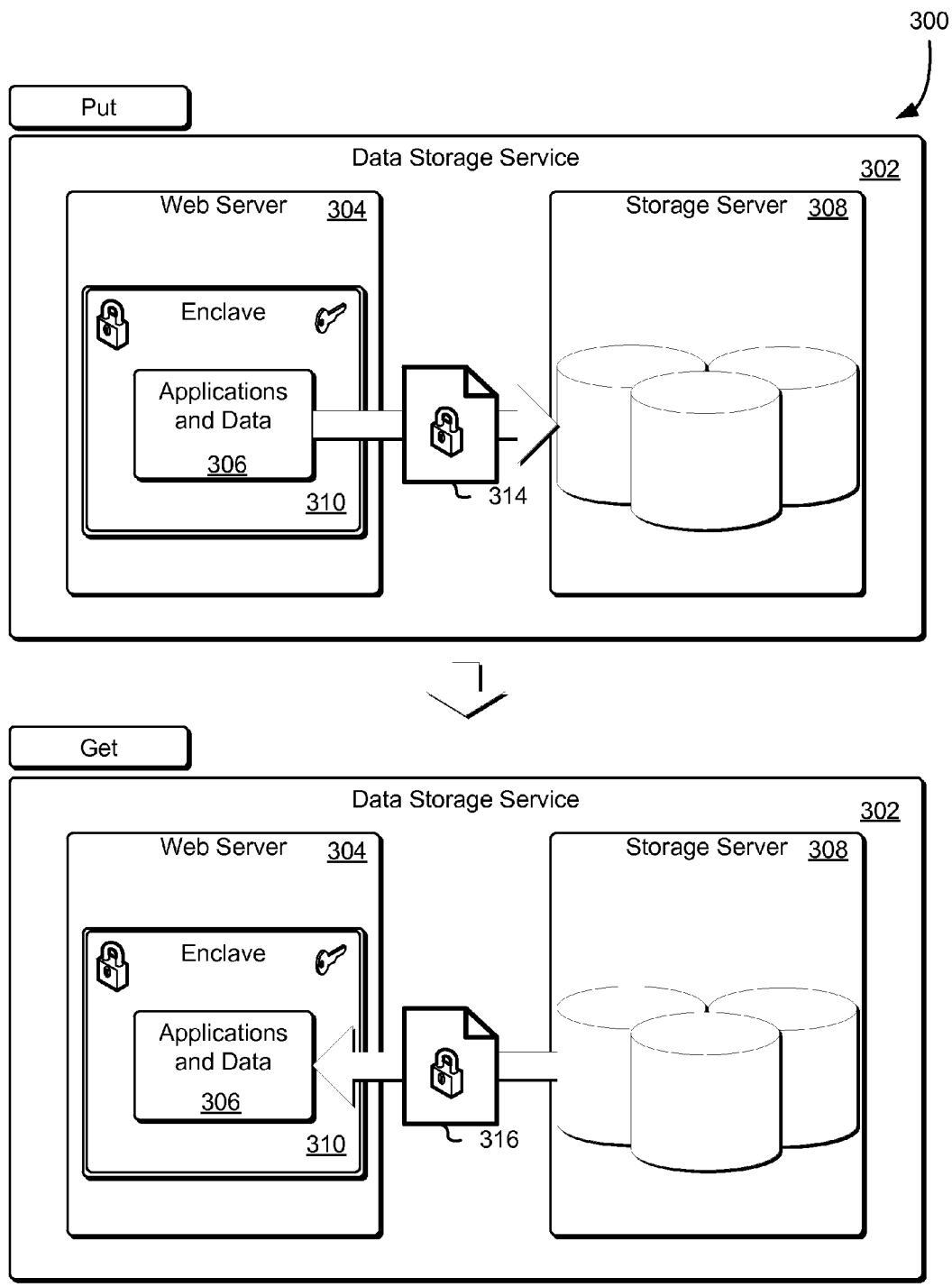
FIG. 3 illustrates an example of a data storage service with an enclave for transforms instantiated on a web server.

FIG. 3 illustrates an aspect of an environment 300 in which various embodiments of the present disclosure may be practiced. Specifically, FIG. 3 depicts an environment 300 of an example data storage service 302 having a web server 304 having at least one application 306 and a data server 308, the web server 304 being configured to support secure execution environments for an enclave 310 to host secure applications and data. As noted, the data storage service 302 may be services provided by a computing resource service provider for providing data storage services to customer, as the data storage service 1000 described in conjunction with FIG. 10. Also, as noted, the web server 304 and data server 308 may be any suitable computing devices similar to application server 1208, web server 1206, data store 1210 described in conjunction with FIG. 12.

An application of the present embodiment, as illustrated in environment 300, could be where the application 306 is an application of the applications and data securely running securely in the enclave 310 of the web server 304 requests to store data 314 at the data server 308. In the environment 300, the data 314 may be encrypted according to a cryptography scheme where the enclave holds the encryption/decryption key(s).

The application 306 of the applications and data of the enclave 310 of the web server 304 may request to receive confidential data 316 from the data server 308. Note that the application 306 of the applications and data of the enclave 310 of the web server 304 may be the same or a different application than the application 306 described above as requesting the storage of the data 314. The application 306 of the enclave 310 of the web server 304 may retrieve data 316 from the data server 308. As illustrated, the data 316 being retrieved may be encrypted. The application 306 running in the enclave 310 of the web server 304 may decrypt the encrypted data 316. The data or portion of the data 316 may be re-encrypted using a public key of a public-private cryptography scheme and may then provide the encrypted data or portion of the data 314 to an entity needing the data, such as a customer, user, service, application or some other entity. In some cases, the application 306 may only provide a response without providing any of the unencrypted data outside the enclave 310, such as "data found," "data not found," or "data verified," etc. In some embodiments, the data or portion of the data 316 may not necessarily be encrypted but may instead be provided to an entity needing the data in a form dictated according to the privileges of the entity requesting the data 316, such as in a wholly or partially-filtered or obfuscated form or only providing the portion of the data 316 that the entity needing the data has sufficient privileges to request.

Figure 4:
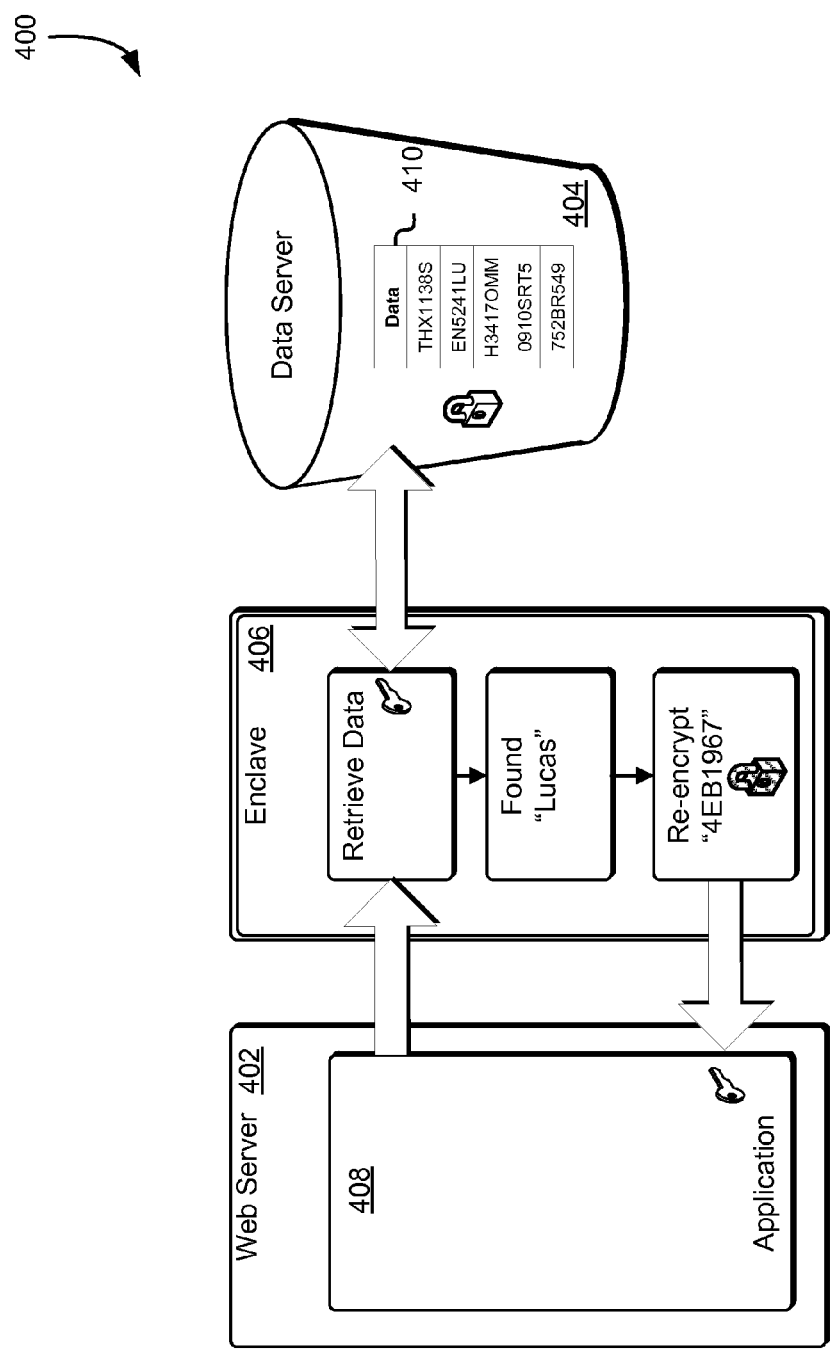
FIG. 4 illustrates an example of an enclave re-encrypting data.

FIG. 4 illustrates an example 400 in which various embodiments of the present disclosure may be practiced. Specifically, FIG. 4 depicts an example 400 application of at least one embodiment of the present disclosure, wherein a web server 402 requests a portion of data from a data server 404, and the input and output of the request passes through an enclave 406. As noted, the web server 402 and data server 404 may be any suitable computing devices similar to application server 1208, web server 1206, and data store 1210 described in conjunction with FIG. 12.

In the example 400 depicted, an application 408 running on the web server 402 may request to retrieve some data, such as a name associated with a specified ID. The request is passed to the enclave 406. Although depicted as separate from the web server 402 and the data server 404 for illustration purposes, the enclave 406 may actually be executing in an instance on the web server 402, on the data server 404, or on some other server in the data path, depending on the factors relevant to where to instantiate the enclave 406, including, but not limited to, network topology, network latency, geography, security, hardware support of secure environment instructions (e.g., SGX, TPM, etc.), fault tolerance, and/or other reasons.

Here, application code running within the enclave 406 may retrieve encrypted data 410 encrypted with a certain public key from the data server 404. Note that the data server 404 may store the data 410 in a variety of formats including, but not limited to, objects, records in tables, etc., and the data 410 retrieved from the data server 404 may be as varied as a large collection of objects retrieved by making a call to an application programming interface or a single record entry of a table as a result of a structured query language command. Any manner of storing and retrieving data 410 as would be contemplated by a person having ordinary skill in the art may be considered as within the scope of the present disclosure.

As can be seen from the example 400, application code running within the enclave 406 retrieves the data 410, decrypts the data 410 using a private key held within the enclave 406, performs some processing on the data 410, and determines that the data sought by the application 408 is present within the data 410; i.e., the name "Lucas" is found to match the specified ID in example 400. The application code running within the enclave 406 then encrypts the name "Lucas" in example 400, resulting in the ciphertext "4EB1967" using a different public key or a session key held within the enclave 406. The enclave 406 may then provide the encrypted name to the requesting application 408 of the web server 402, whereupon the application 408 of the web server 402 may decrypt the encrypted name utilizing a corresponding private key or session key. The result being that no portion of the unencrypted data 410 is accessible outside the enclave 406.

Figure 5:
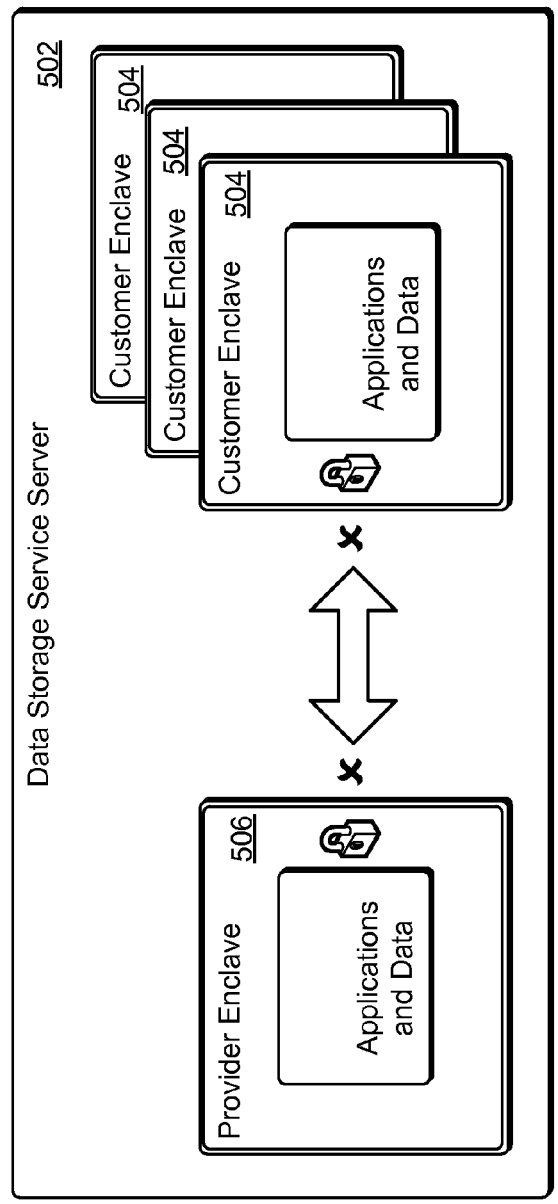
FIG. 5 illustrates an example of a provider enclave separate from customer enclaves in a data storage service.

FIG. 5 illustrates an example 500 in which various embodiments of the present disclosure may be practiced. Specifically, FIG. 5 depicts an example 500 of a data storage service 502 with customer enclaves 504 instantiated in the data storage service 502 as well as a provider enclave 504 instantiated in the data storage service. As noted, the data storage service 502 may be services provided by a computing resource service provider for providing data storage services to customer, as the data storage service 1000 described in conjunction with FIG. 10.

In this embodiment, it may be that the provider of the data storage service 502, such as a computing resource service provider, may be concerned that provider code (e.g., code for running the web site, etc.) executing in the data storage service 502 may be accessible by customer code also executing in the data storage service, for example in the customer enclaves 504. To alleviate these concerns, the provider may choose to place sensitive provider data and execute sensitive provider code within a provider enclave 506, such as the provider code that retrieves data from the data store for customers, private encryption keys, billing data, etc., in a manner similar to the embodiments described in the present disclosure. In this way, just as the provider may not have access to customer applications and data within the customer enclaves 504, the customers may be prevented from accessing the provider applications and data within the provider enclave 506. In some embodiments, a virtualization layer, such as a hypervisor, may maintain the isolation of provider code from customer code.

Figure 6:
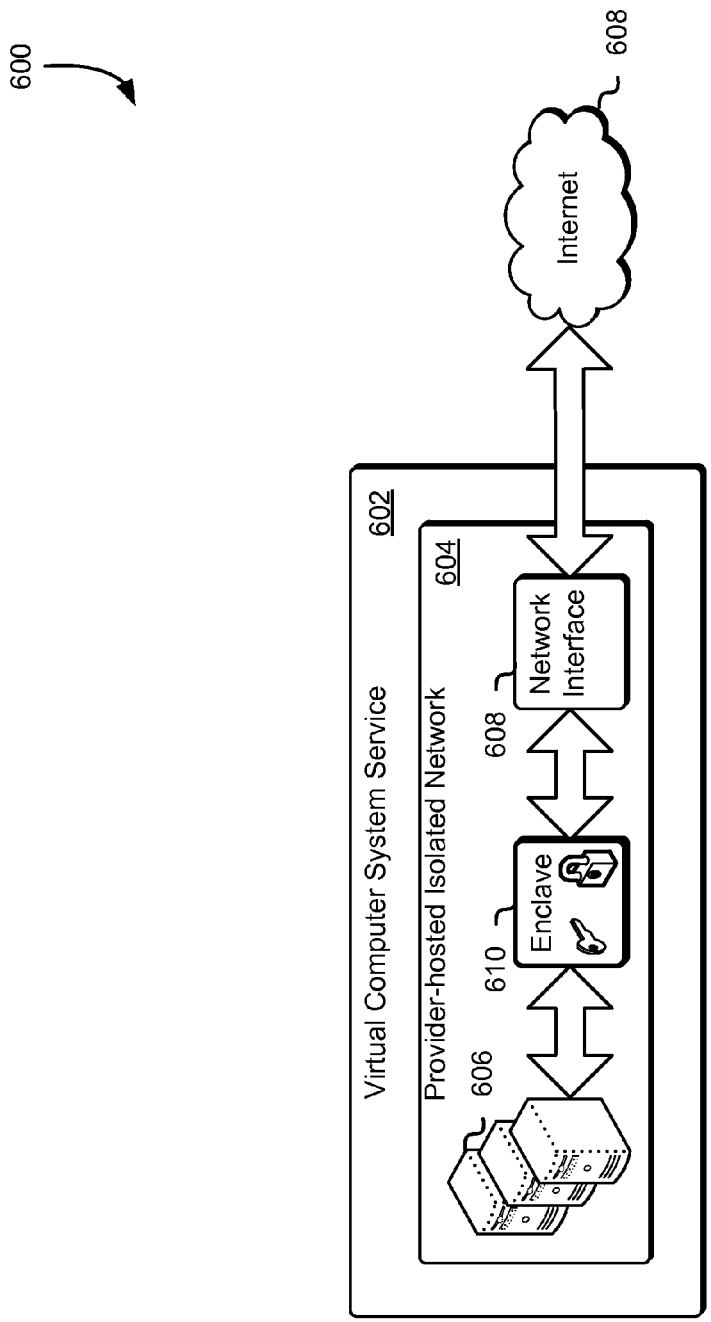
FIG. 6 illustrates an enclave acting as an interface between an isolated network and outside networks.

FIG. 6 illustrates an example 600 in which various embodiments of the present disclosure may be practiced. Specifically, FIG. 6 depicts a virtual computer system service 602 of a computing resource service provider hosting an isolated network 604 of virtual machines 606 for a customer. Note that while a network of virtual machines is depicted in example 600, this embodiment may be practiced using physical computer systems as well. A provider-hosted isolated network, as in the isolated network 604, may be a network of virtual machines 606 in a distributed system wherein the individual virtual machines 606 only have visibility to virtual machines within the isolated network 604, and do not have visibility to systems outside the isolated network, such as from the Internet 608, except through a network interface 608 (e.g., gateway router), which may be a virtual or physical device. Note that although the Internet 608 is depicted as the outside network, the outside network could be any type of physical or virtual network other than the isolated network 604, including other networks within the virtual computer system service 602.

Likewise, systems outside the isolated network may not have visibility to the virtual machines inside the isolated network except through the network interface. To protect data flowing out of the isolated network 604, an enclave 610 may be utilized to process and screen all data flowing out of the isolated network 604, in a manner similar to that described in the present disclosure. Similarly, any applications and/or data passing into the 604 may be processed and filtered, for example for viruses, spyware, and other security concerns, within the enclave 610. In this manner, systems outside the 604 may not have direct access to the virtual machines 606 without first being screened by the enclave 610. In such an embodiment as illustrated by example 600, an enclave as described herein may be instantiated on the network interface 608 itself or may be instantiated on some other suitable system.

Figure 7:
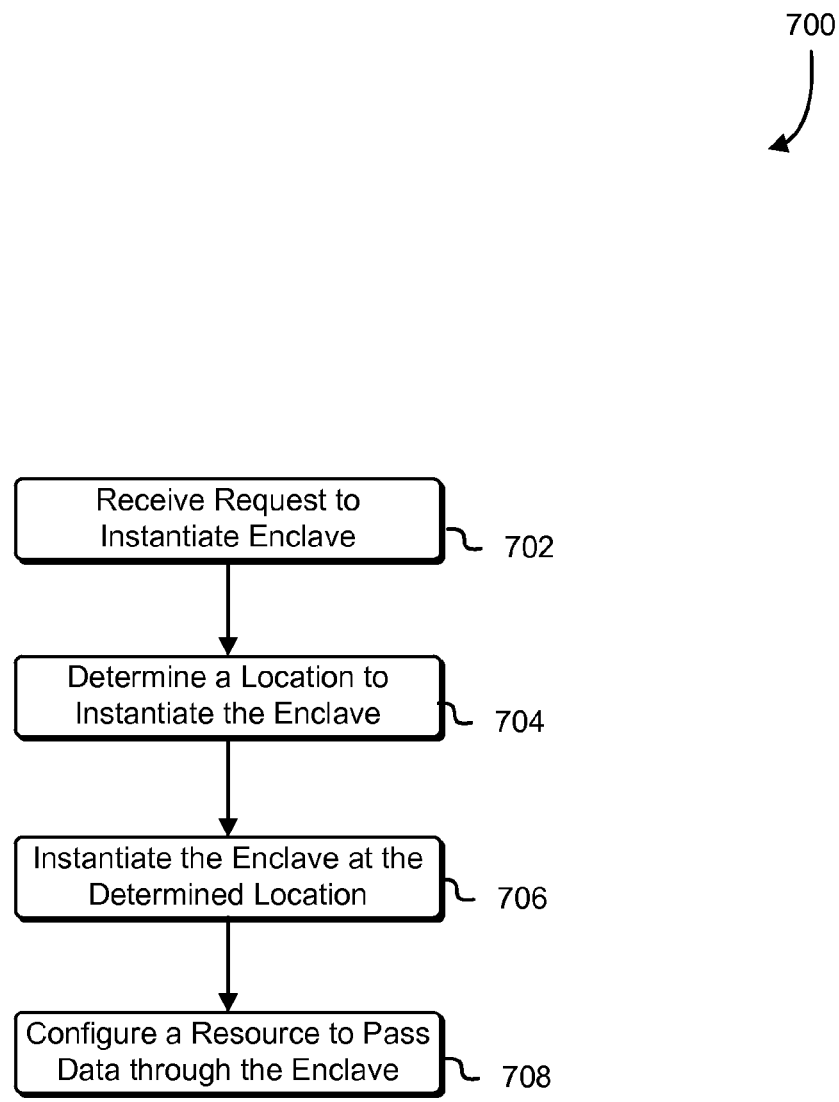
FIG. 7 is a block diagram that illustrates an example of instantiating an enclave in accordance with at least one embodiment.

FIG. 7 is a block diagram illustrating an example of a process 700 for instantiating an enclave in accordance with various embodiments. The process 700 may be performed by any suitable system such as a data server, application server or web server, such as the application server 1208 and web server 1206, or any electronic client device such as the electronic client device 1202 described in conjunction with FIG. 12. The process 700 includes a series of operations wherein an enclave is instantiated at a location determined in accordance with any of a variety of factors. In 702, the system performing the process 702 receives a request to instantiate an enclave for processing data. The request may be received from a customer, a user, an application, a service or other such entity. For example, the request may be generated in response to a customer application wishing to read and write data to a data store on a data server of a data storage service of a computing resource service provider.

In 704, a location for instantiating the enclave is determined. In some embodiments, the enclave may be instantiated or otherwise placed in a data path between two systems, such as a web server and a data server, that exchange data being processed by the enclave. Factors for determining the location to place the enclave are various and may include, but not be limited to, network topology (e.g., the distance to the location in the computing resource service provider infrastructure to a data server hosting a data store of the data, etc.), network latency, geography (e.g., servers that are located in the same geographic region), security, hardware support of secure environment instructions (e.g., SGX, TPM, etc.), fault tolerance, fault zone (e.g., computer systems grouped according to a redundancy or fault isolation scheme) location and/or other reasons. One or more possible locations may be determined for the enclave, and a location may be selected from the one or more possible locations for placing the enclave. In a distributed system, because relevant data may be stored on multiple servers redundantly and/or in a distributed fashion, it may be determined to place multiple enclaves for processing the data at multiple data path locations.

In 706, once the location has been determined in 704, the enclave is instantiated or placed at the determined location. As noted, in some cases, the enclave may be placed on a data server hosting the data store of the relevant data. In other cases, the enclave may be placed on a web server from which the data may be coming from for storage or to which the data may be coming to after being retrieved from storage. In still other embodiments, the enclave may be instantiated on a different server in the data path than a web server or data server, or may be instantiated on a server of a virtual computer system service. In other embodiments, the enclave may be instantiated in a data path between a provider-hosted isolated network and a gateway router providing a bridge from the isolated network to outside networks.

In 708, a resource, such as a web server or data server of a data storage service of a computing resource service provider, may be configured to route data and/or data requests through the enclave placed by the operation of 708. For example, a web server may be configured to pass data destined for storage through the enclave for encryption prior to storage in a data store. Likewise, a data server may be configured to pass encrypted data stored in a data store through an enclave for decryption and/or re-encryption. Similarly, in embodiments where an enclave is instantiated between an isolated network and a gateway router, the isolated network and/or the gateway router may be configured to pass received data through the enclave before being routed to its destination.

Figure 8:
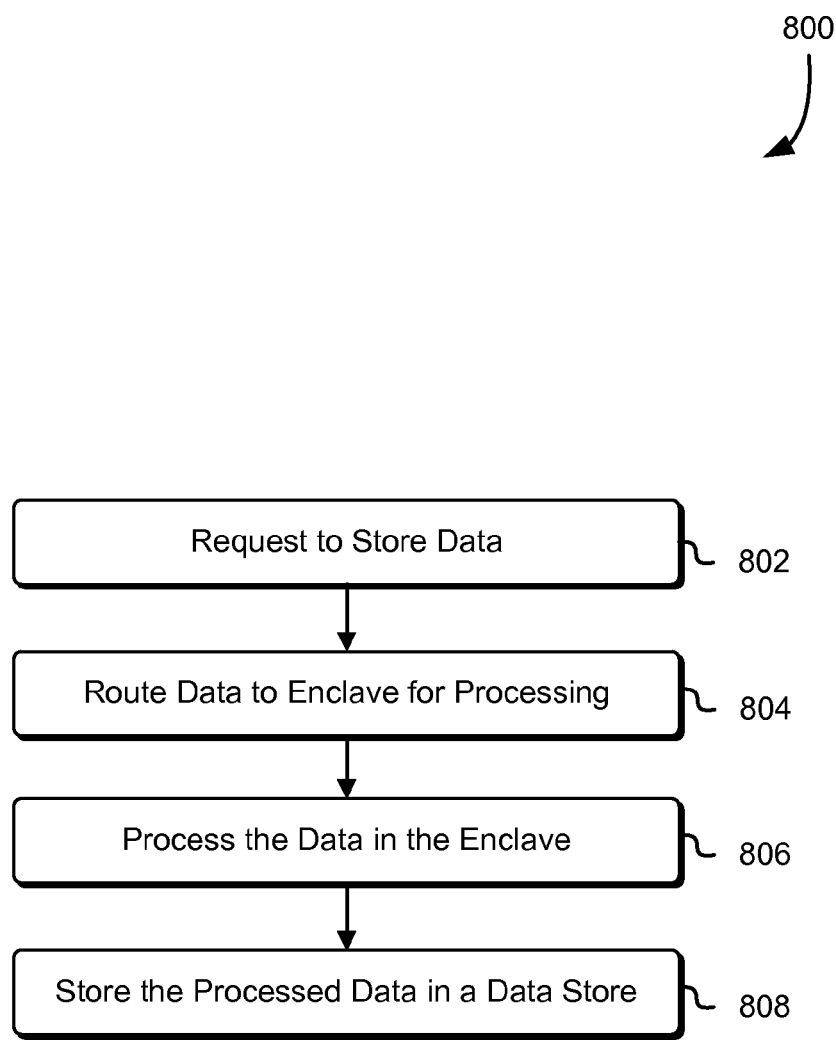
FIG. 8 is a block diagram that illustrates an example of routing data through an enclave for storage in accordance with at least one embodiment.

FIG. 8 is a block diagram illustrating an example of a process 800 for storing data in accordance with various embodiments. The process 800 may be performed by any suitable system such as a data server, application server or web server, such as the application server 1208 and web server 1206, or any electronic client device such as the electronic client device 1202 described in conjunction with FIG. 12, or any electronic client device such as the electronic client device 1202 described in conjunction with FIG. 12. The process 800 includes a series of operations wherein data passes through an enclave for storage, such as in a data store of a data storage service of a computing resource service provider. In 802, a need to route data for storage through an enclave exists. As described herein, the need may exist because the data is to be encrypted in the data store by a key held within the enclave, or for various other reasons, such as executable code within the enclave may maintain a log of the type of data being stored or code executing within the enclave may perform certain sensitive processing operations based on the data being stored (e.g., credit processing, etc.).

In 804, the data may be provided to the enclave. In some cases the data may be provided to the enclave by an application, customer, user, resource, or service making call to an application programming interface. Once within the enclave, in 806, the data may be processed within the enclave. In some embodiments, the data may then be processed by encrypting the data according to a key held within the enclave, such as a public key of a public-private asymmetrical key scheme. In other embodiments, the data may be provided in encrypted form, and code executing within the enclave may process the data by decrypting the data using a private key of a public-private key scheme, using a symmetrical session key or some other scheme, and then re-encrypting the data using a different key. In other embodiments, the data may be passed through—encrypted or unencrypted—without change; in some of these embodiments, the data may be passed through without change if the data meets certain criteria, such as not encrypting data that is already encrypted, not changing certain types of data or data accompanied by a code indicating that the data must not be changed, or not changing data that passes an anti-virus scan (whereas data that fails an anti-virus scan may be dropped, quarantined, or undergo removal of the virus). In still other embodiments usable in combination with other embodiments, information about the data may be logged but the data itself may or may not be changed. In still other embodiments usable in combination with other embodiments, the data may be used to process certain transactions, such as credit card processing or other transactions.

In 808, the data may be stored in a data store, such as on a data server of a data storage service of a computing resource service provider. As noted, the data may or may not be encrypted or otherwise changed before storage. Furthermore, as noted, in some embodiments not all data passing through the enclave may be stored. As one example among many, data detected as containing a virus detected by anti-virus code executing within an enclave may not be passed further than 806. In another example, a log entry that the data was processed according to the code executing in the enclave may be stored in the data store rather than the data itself (e.g., a log entry indicating that a credit card was processed, but the actual credit card data may not be stored).

Figure 9:
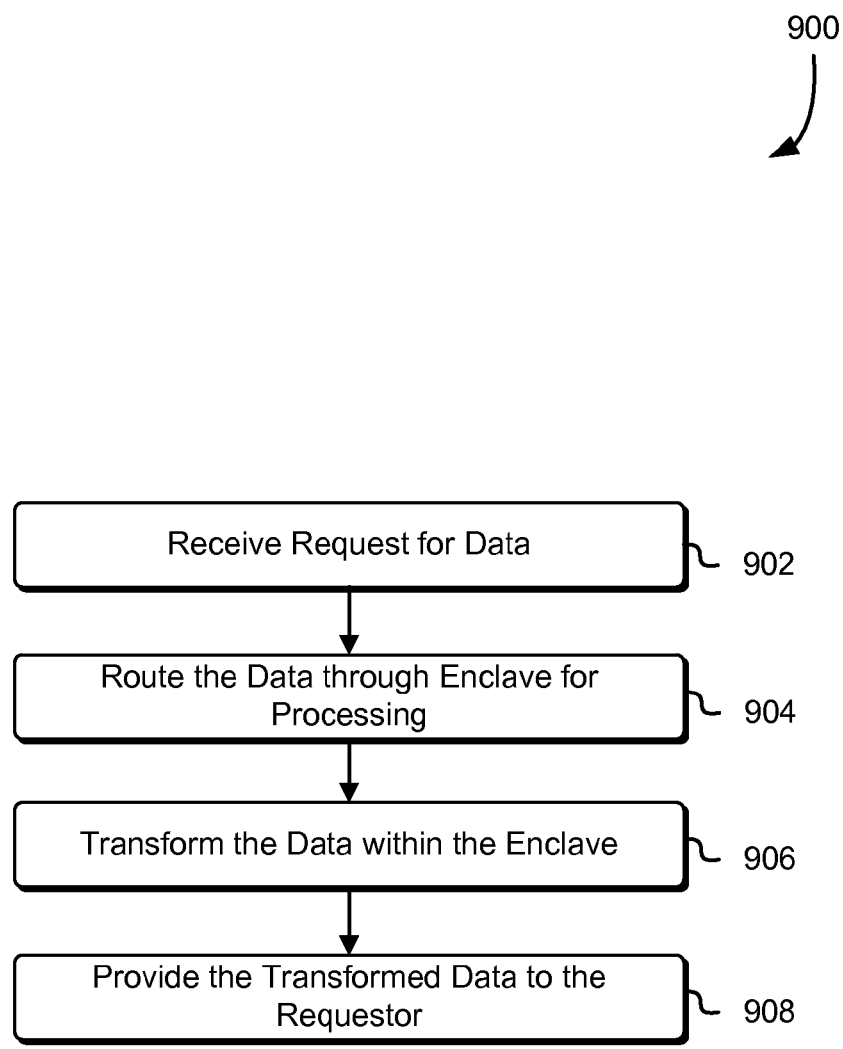
FIG. 9 is a block diagram that illustrates an example of routing data through an enclave from storage to a requestor in accordance with at least one embodiment.

FIG. 9 is a block diagram illustrating an example of a process 900 for receiving data into an enclave from a data store in accordance with various embodiments. The process 900 may be performed by any suitable system such as a data server, application server or web server, such as the application server 1208 and web server 1206, or any electronic client device such as the electronic client device 1202 described in conjunction with FIG. 12, or any electronic client device such as the electronic client device 1202 described in conjunction with FIG. 12. The process 900 includes a series of operations wherein data may be retrieved from storage, transformed, and the transformed data may be provided to the requesting entity. In 902, a request for data, such as data stored in a data store on a data server of a data storage service of a computing resource service provider, is received. In some embodiments, the request may be made to an enclave configured to process such requests located in the data path between the requestor and the stored data. In other embodiments, the request may be made directly to the data server from the requesting entity. The request may be received from a user, customer, application, service, or resource such as a web server of the data storage service.

In 904, the data is retrieved into an enclave configured to process the data. In some embodiments, the enclave makes the request to the data store for the data and the data is provided to the enclave. In other embodiments, the data server may be configured to route the data through the enclave. In some of these embodiments, the data server may determine which data to pass to the enclave; for example, the data server may be able to identify that certain types of data, such as encrypted data, should be routed to the enclave for decryption and/or re-encryption, whereas other types of data need not pass through the enclave. In some cases, the data may be in the form of one or more data objects. In other cases, the data may be in the form of one or more records from a database, such as a relational database.

In 906, the data is processed before being provided to the requestor. In some cases, the operations performed in 906 do not necessarily affect the form of the data provided to the requestor, but rather operations may be performed based on the type of data or the contents of the data. For example, the data may not be changed, but a validation operation may instead be performed on the data to determine whether it has been tampered with or forged. For example, the data may be inspected in 906 to determine whether the requestor has adequate permissions to receive the data; if the requestor has adequate permissions, the data may be forwarded to the requestor in the same form as it was received from the data store, however if the requestor has insufficient permissions, the data may be filtered (e.g., portions of the data may be selectively removed) or one or more portions may be obfuscated, blocked/dropped or otherwise not provided to the requestor in the same format as received into the enclave or at all. In some cases, the operations performed at 906 may include decrypting encrypted data received from the data store and re-encrypting the data using a different key than the data was encrypted within the data store. In this manner, the key used to encrypt the data in the data store may not leave the enclave, thereby reducing the risk that the security of the data in the data store may be compromised. In some embodiments, the key used to re-encrypt the data may be a public key of a public-private key scheme wherein the private key is held by the requestor or other trusted entity and, in some cases, the public key may have been provided to the enclave by that requestor or other trusted entity. In other embodiments, the key used to re-encrypt the data may be a symmetrical session key wherein the requestor and/or other trusted entity may have a copy of the session key provided to the requestor and/or other trusted entity encrypted with a public key and decrypted with a private key held by the requestor and/or other trusted entity (i.e., enveloping).

Finally, in 908, the data passes out of the enclave and to the requestor and/or other trusted entity. As noted, in some cases the data may be provided to the requestor unchanged from the form received into the enclave; for example, the requestor may be seeking to verify that the data being stored in the data store is still being encrypted with a particular key and may request that the data be passed to the requestor still in its encrypted form. As further noted, the data may not be provided at all, such as in a case where the requestor has insufficient privileges to receive the data or in a case where the relevant data could not be retrieved from the data store. And, also noted, in other cases the data provided to the requestor may be a portion of the data received, may be a filtered/obfuscated version of the data received, may be a re-encrypted or decrypted version of the data received, or any combination of the above forms. In some cases, the data provided to the requestor may be different data than received from the data store; e.g., the requestor may be provided with an error message or some other message in response to a request for the data.

Cryptographic operations that may be performed in various embodiments include, but are not limited to, digital signature generation, digital signature verification, encryption, decryption, and random number generation. Operations that utilize cryptographic keys include, but are not limited to, such as public key and/or private key cryptographic algorithms. For example, as discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include, but are not limited to, the advanced encryption standard (AES), the data encryption standard (DES), triple DES (3DES), Serpent, Twofish, blowfish, CAST5, RC4 and the international data encryption algorithm (IDEA). Example modes of block ciphers include, but are not limited to, the cipher-block chaining (CBC) mode, propagating cipher-block chaining (PCBC) mode, cipher feedback mode (CFB), output feedback (OFB) mode, counter (CTR) mode, and other modes, such as authenticated encryption modes such as eXtended Ciphertext Block Chaining (XCBC) mode, Integrity Aware CBC (IACBC) mode, Integrity Aware Parallelizable (IAPM) mode, Offset Codebook (OCB) mode, EAX and EAX Prime modes, Carter-Wegman+CTR (CWC) mode, Counter with CBC-MAC (CCM) mode, Galois/Counter (GCM) mode. Symmetric key algorithms may also include those used to generate output of one way functions and include, but are not limited to algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include, but are not limited to those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure and the above is not intended to be an exhaustive list.

Figure 10:
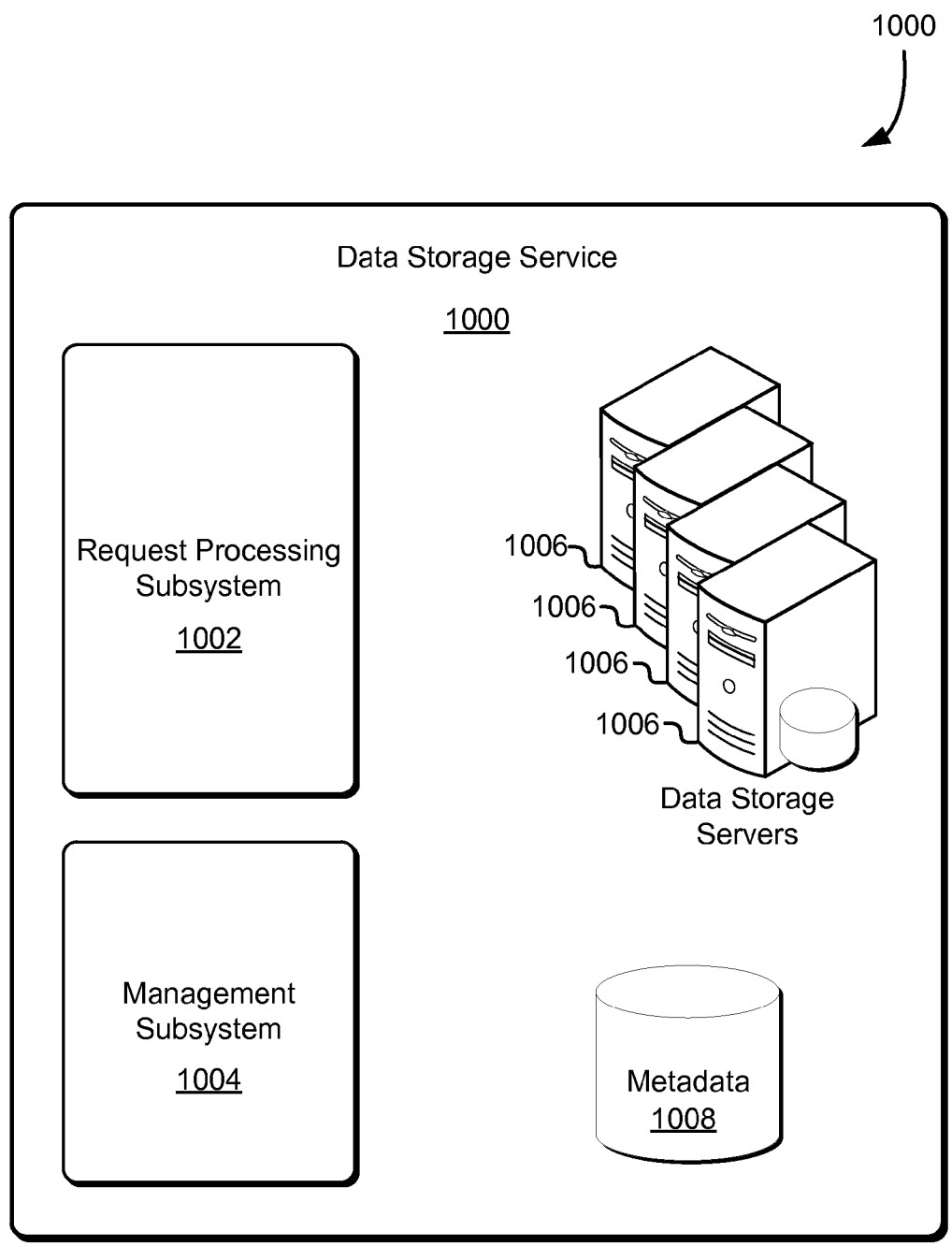
FIG. 10 illustrates an example of a data storage service which may be implemented in accordance with various embodiments.

FIG. 10 shows an illustrative example of a data storage service in accordance with various embodiments. The data storage service 1000 may be a service of a computing resource provider used to operate an on-demand data storage service such as described above in connection with FIG. 1. As illustrated in FIG. 10, the data storage service 1000 includes various subsystems such as a request processing subsystem 1002 and a management subsystem 1004. The data storage service 1000 may also include a plurality of data storage servers 1006 and a metadata storage 1008, which may store metadata about various data objects stored among the data storage servers 1006 as described herein. In an embodiment, the request processing subsystem 1002 is a collection of computing resources, such as webservers and application servers, collectively configured to process requests submitted to the data storage service 1000. The request processing subsystem 1002, for example, may include one or more webservers that provide a web service interface to enable customers of the data storage service 1000 to submit requests to be processed by the data storage service 1000. The request processing subsystem 1002 may include computers systems configured to make various determinations in connection with the processing of requests, such as whether policy allows fulfillment of a request, whether requests are authentic (e.g., electronically signed using a suitable cryptographic key) and otherwise.

Components of the request processing subsystem may interact with other components of the data storage service 1000 (e.g., through network communications). For example, some requests submitted to the request processing subsystem 1002 may involve the management of computing resources which may include data objects stored by the data storage servers 1006. The request processing subsystem 1002, for example, may receive and process requests to modify computing resources. For instance, in some examples, data objects are logically organized into logical data containers. Data objects associated with a logical data container may, for example, be said to be in the logical data container. Requests to the data processing subsystem 1002 may include requests for creating logical data containers, deleting logical data containers, providing an inventory of a logical data container, providing or updating access control policy with respect to one or more logical data containers and the like.

The requests may be processed by the management subsystem 1004 upon receipt by the request processing subsystem 1002. If applicable, various requests processed by the request processing subsystem 1002 and/or management subsystem 1004, may result in the management subsystem 1004 updating metadata associated with data objects and logical data containers stored in the metadata store 1008. Other requests that may be processed by the request processing subsystem 1002 include requests to perform operations in connection with data objects. The requests, for example, may include requests to upload data objects to the data storage service 1000, to download data objects from the data storage service 1000, to delete data objects stored by the data storage service 1000 and/or other operations that may be performed.

Requests processed by the request processing subsystem 1002 that involve operations on data objects (upload, download, delete, e.g.) may include interaction between the request processing subsystem 1002 and one or more data storage servers 1006. The data storage servers 1006 may be computer systems communicatively coupled with one or more storage devices for the persistent of data objects. For example, in order to process a request to upload a data object, the request processing subsystem may transmit data to a data storage server 1006 for persistent storage. It is noted, however, that in some embodiments, client (e.g., customer) computer systems may transmit data directly to the data storage servers 1006 instead of through severs in the request processing subsystem.

In some embodiments, the request processing subsystem 1002 transmits data to multiple data storage servers 1006 for the purposes of redundantly storing the data to allow the retrievability of data in the event of failure of an individual data storage server 1006 and/or associated data storage device. For example, in some embodiments, the request processing subsystem uses a redundancy in coding schemes such as erasure coding to deconstruct a data object into multiple parts that are stored among the data storage servers 1006. The parts may be configured such that if access to a certain number of parts is lost, the data object may nevertheless be re-constructible from the remaining parts that remain accessible.

To enable efficient transfer of data between the request processing subsystem 1002 and the data storage servers 1006 and/or generally to enable quick processing of requests, the request processing subsystem 1002 may include one or more databases that enable the location of data among the data storage servers 1006. For example, the request processing subsystem 1002 may operate a key value store that serves to associate identifiers of data objects with locations among the data storage servers 1006 for accessing data of the data objects.

FIG. 11 shows an example of a customer connected to a computing resource service provider in accordance with at least one embodiment. The computing resource service provider 1102 may provide a variety of services to the customer 1104 and the customer 1104 may communicate with the computing resource service provider 1102 via an interface 1126, which may be a web services interface or any other type of customer interface. While FIG. 11 shows one interface 1126 for the services of the computing resource service provider 1102, each service may have its own interface and, generally, subsets of the services may have corresponding interfaces in addition to or as an alternative to the interface 1126. The customer 1104 may be an organization that may utilize one or more of the services provided by the computing resource service provider 1102 to maintain and deliver information to its employees, which may be located in various geographical locations. Additionally, the customer 1104 may be an individual that utilizes the services of the computing resource service provider 1102 to deliver content to a working group located remotely. As shown in FIG. 11, the customer 1104 may communicate with the computing resource service provider 1102 through a network 1106, whereby the network 1106 may be a communication network, such as the Internet, an intranet or an Internet service provider (ISP) network. Some communications from the customer 1104 to the computing resource service provider 1102 may cause the computing resource service provider 1102 to operate in accordance with one or more embodiments described herein or a variation thereof.

The computing resource service provider 1102 may provide various computing resource services to its customers. The services provided by the computing resource service provider 1102, in this example, include a virtual computer system service 1108, a block-level data storage service 1110, a cryptography service 1112, an on-demand data storage service 1114, a notification service 1116, an authentication system 1118, a policy management service 1120, a task service 1122 and one or more other services 1124. It is noted that not all embodiments described herein include the services 1108-1124 described with reference to FIG. 11 and additional services may be provided in addition to or as an alternative to services explicitly described herein. As described herein, each of the services 1108-1124 may include one or more web service interfaces that enable the customer 1104 to submit appropriately configured API calls to the various services through web service requests. In addition, each of the services may include one or more service interfaces that enable the services to access each other (e.g., to enable a virtual computer system of the virtual computer system service 1108 to store data in or retrieve data from the on-demand data storage service 1114 and/or to access one or more block-level data storage devices provided by the block level data storage service 1110).

The virtual computer system service 1108 may be a collection of computing resources configured to instantiate virtual machine instances on behalf of the customer 1104. The customer 1104 may interact with the virtual computer system service 1108 (via appropriately configured and authenticated API calls) to provision and operate virtual computer systems that are instantiated on physical computing devices hosted and operated by the computing resource service provider 1102. The virtual computer systems may be used for various purposes, such as to operate as servers supporting a website, to operate business applications or, generally, to serve as computing power for the customer. Other applications for the virtual computer systems may be to support database applications, electronic commerce applications, business applications and/or other applications. Although the virtual computer system service 1108 is shown in FIG. 11, any other computer system or computer system service may be utilized in the computing resource service provider 1102, such as a computer system or computer system service that does not employ virtualization or instantiation and instead provisions computing resources on dedicated or shared computers/servers and/or other physical devices.

The block-level data storage service 1110 may comprise one or more computing resources that collectively operate to store data for a customer 1104 using block-level storage devices (and/or virtualizations thereof). The block-level storage devices of the block-level data storage service 1110 may, for instance, be operationally attached to virtual computer systems provided by the virtual computer system service 1108 to serve as logical units (e.g., virtual drives) for the computer systems. A block-level storage device may enable the persistent storage of data used/generated by a corresponding virtual computer system where the virtual computer system service 1108 may only provide ephemeral data storage.

The computing resource service provider 1102 also includes a cryptography service 1112. The cryptography service 1112 may utilize one or more storage services of the computing resource service provider 1102 to store keys of the customers in encrypted form, whereby the keys may be usable to decrypt customer 1104 keys accessible only to particular devices of the cryptography service 1112.

The computing resource service provider 1102 further includes an on-demand data storage service 1114. The on-demand data storage service 1114 may be a collection of computing resources configured to synchronously process requests to store and/or access data. The on-demand data storage service 1114 may operate using computing resources (e.g., databases) that enable the on-demand data storage service 1114 to locate and retrieve data quickly, so as to allow data to be provided in responses to requests for the data. For example, the on-demand data storage service 1114 may maintain stored data in a manner such that, when a request for a data object is retrieved, the data object can be provided (or streaming of the data object can be initiated) in a response to the request. As noted, data stored in the on-demand data storage service 1114 may be organized into data objects. The data objects may have arbitrary sizes except, perhaps, for certain constraints on size. Thus, the on-demand data storage service 1114 may store numerous data objects of varying sizes. The on-demand data storage service 1114 may operate as a key value store that associates data objects with identifiers of the data objects which may be used by the customer 1104 to retrieve or perform other operations in connection with the data objects stored by the on-demand data storage service 1114.

In the environment illustrated in FIG. 11, a notification service 1116 is included. The notification service 1116 may comprise a collection of computing resources collectively configured to provide a web service or other interface and browser-based management console. The management console can be used to configure topics for which customers seek to receive notifications, configure applications (or people), subscribe clients to the topics, publish messages, or configure delivery of the messages over clients' protocol of choice (i.e., hypertext transfer protocol (HTTP), e-mail and short message service (SMS), among others). The notification service 1116 may provide notifications to clients using a "push" mechanism without the need to periodically check or "poll" for new information and updates. The notification service 1116 may further be used for various purposes such as monitoring applications executing in the virtual computer system service 1108, workflow systems, time-sensitive information updates, mobile applications, and many others.

As illustrated in FIG. 11, the computing resource service provider 1102, in various embodiments, includes an authentication system 1118 and a policy management service 1120. The authentication system 1118, in an embodiment, is a computer system (i.e., collection of computing resources) configured to perform operations involved in authentication of users of the customer. For instance, one of the services 1108-1116 and 1120-1124 may provide information from a user to the authentication system 1118 to receive information in return that indicates whether or not the user requests are authentic.

The policy management service 1120, in an embodiment, is a computer system configured to manage policies on behalf of customers (such as customer 1104) of the computing resource service provider 1102. The policy management service 1120 may include an interface that enables customers to submit requests related to the management of policy. Such requests may, for instance, be requests to add, delete, change or otherwise modify policy for a customer or for other administrative actions, such as providing an inventory of existing policies and the like.

The computing resource service provider 1102, in various embodiments, is also equipped with a task service 1122. The task service 1122 is configured to receive a task package from the customer 1104 and enable executing tasks as dictated by the task package. The task service 1122 may be configured to use any resource of the computing resource service provider 1102, such as one or more instantiated virtual machines or virtual hosts, for executing the task. The task service 1124 may configure the one or more instantiated virtual machines or virtual hosts to operate using a selected operating system and/or a selected execution application in accordance with a requirement of the customer 1104.

The computing resource service provider 1102 additionally maintains one or more other services 1124 based at least in part on the needs of its customers 1104. For instance, the computing resource service provider 1102 may maintain a database service for its customers 1104. A database service may be a collection of computing resources that collectively operate to run one or more databases for one or more customers 1104. The customer 1104 may operate and manage a database from the database service by utilizing appropriately configured API calls. This, in turn, may allow a customer 1104 to maintain and potentially scale the operations in the database. Other services include, but are not limited to, object-level archival data storage services, services that manage and/or monitor other services.

Note that, unless otherwise specified, use of expressions regarding executable instructions (also referred to as code, applications, agents, etc.) performing operations that instructions do not ordinarily perform unaided (e.g., transmission of data, calculations, etc.) in the context of describing disclosed embodiments denote that the instructions are being executed by a machine, thereby causing the machine to perform the specified operations.

Figure 12:
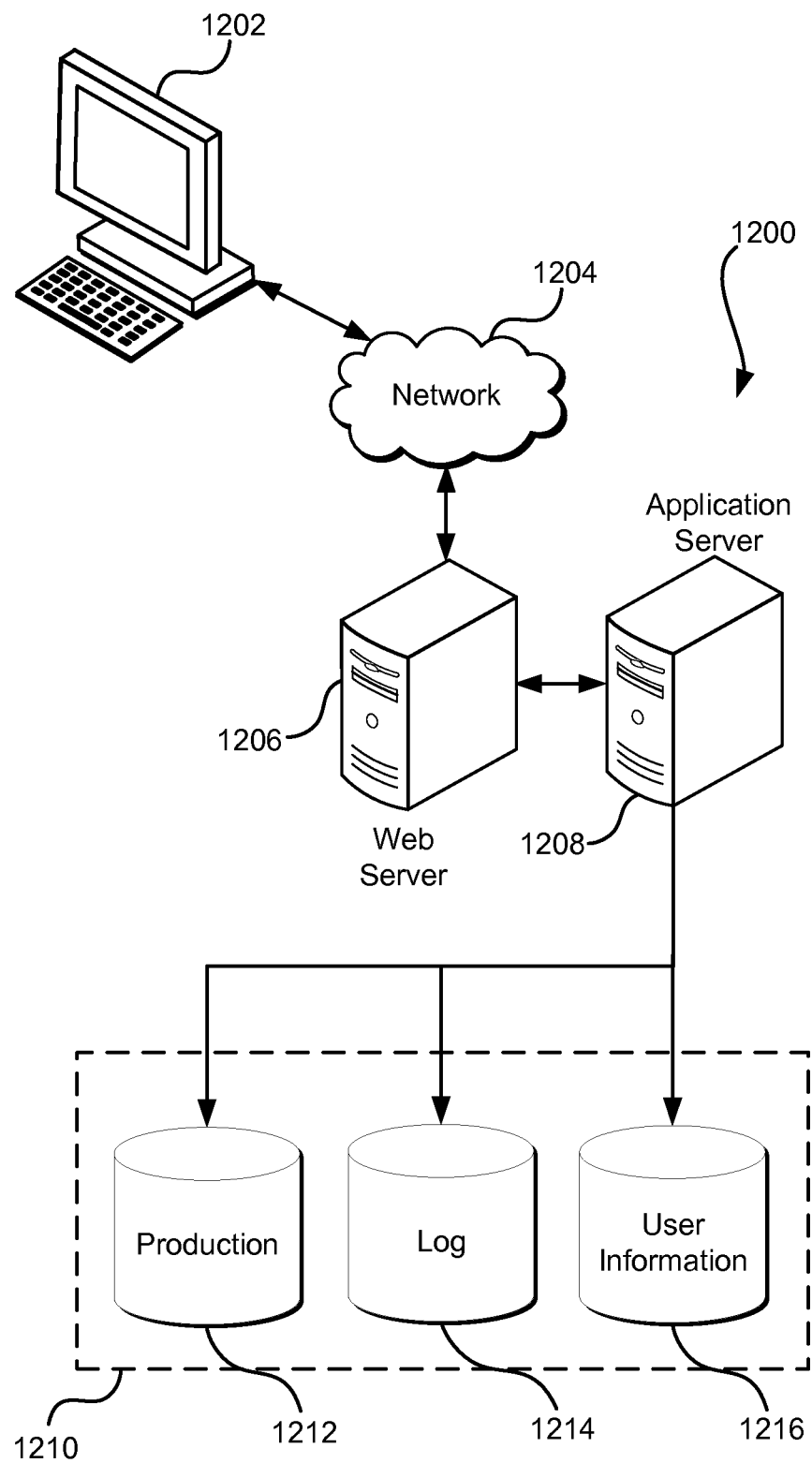
FIG. 12 illustrates an environment in which various embodiments can be implemented.

FIG. 12 illustrates aspects of an example environment 1200 for implementing aspects in accordance with various embodiments. As will be appreciated, although a web-based environment is used for purposes of explanation, different environments may be used, as appropriate, to implement various embodiments. The environment includes an electronic client device 1202, which can include any appropriate device operable to send and/or receive requests, messages or information over an appropriate network 1204 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1202 and the application server 1208, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1210 can include several separate data tables, databases, data documents, dynamic data storage schemes and/or other data storage mechanisms and media for storing data relating to a particular aspect of the present disclosure. For example, the data store illustrated may include mechanisms for storing production data 1212 and user information 1216, which can be used to serve content for the production side. The data store also is shown to include a mechanism for storing log data 1214, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. The application server 1208 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1202. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
under the control of one or more computer systems that execute instructions,
  receiving, from a customer of a computing resource service provider, a request for a secure execution environment for a set of computing resources hosted in a computing environment of the computing resource service provider;
  selecting a location for the secure execution environment from a set of locations in the computing environment, the computing resource service provider is unable to access results of computation within the secure execution environment, the one or more computing resources enable management of the secure execution environment via a specialized instruction set, and hardware of the one or more computer systems prevents unauthorized access to data and running applications within the secure execution environment;
  loading executable code for processing data in the secure execution environment at the location selected; and
  configuring at least a portion of the computing environment to utilize the secure execution environment at least in part to control access to the set of computing resources in accordance with the executable code by:
    processing, at least in part in the secure execution environment, an application programming interface call requesting access to the set of computing resources, or
    processing, at least in part in the secure execution environment, a response to the application programming interface call; and
  causing data associated with the set of computing resources to be provided to the secure execution environment.

2. The computer-implemented method of claim 1, wherein the location selected is in a virtual machine separate from the set of computing resources.

3. The computer-implemented method of claim 1, wherein the executable code specified by the customer is provided by the customer.

4. The computer-implemented method of claim 1, further comprising:
  instantiating the secure execution environment at the location determined for the secure execution environment; and
  loading the executable code includes loading the executable code into the secure execution environment instantiated.

5. A system, comprising:
one or more processors; and
memory including instructions that, as a result of execution by the one or more processors, cause the system to:
  receive, from a customer of a computing resource service provider, a request for a secure execution environment for a set of computing resources hosted in a computing environment of the computing resource service provider;

select a location for the secure execution environment from a set of locations in the computing environment, the computing resource service provider is unable to access results of computation within the secure execution environment, the one or more computing resources enable management of the secure execution environment via a specialized instruction set, and hardware of the system prevents unauthorized access to data and running applications within the secure execution environment;

load executable code for processing data in the secure execution environment at the location selected; and configure at least a portion of the computing environment to utilize the secure execution environment at least in part to control access to the set of computing resources in accordance with the executable code by processing, at least in part in the secure execution environment:
   an application programming interface call requesting access to the set of computing resources, or
   a response to the application programming interface call; and
   cause data associated with the set of computing resources to be provided to the secure execution environment in accordance with the executable code loaded.

6. The system of claim 5, wherein:
the secure execution environment is an enclave; and
the enclave is be programmatically initialized by a call to an application programming interface.

7. The system of claim 5, wherein the secure execution environment is initialized at a location determined at least in part in response to a change to a set of computing resources hosted by the computing resource service provider.

8. The system of claim 5, wherein the set of computing resources comprises a set of data objects.

9. The system of claim 5, wherein the secure execution environment is instantiated in a virtual machine reserved specifically for the secure execution environment.

10. The system of claim 5, wherein the executable code includes bootstrap code and keying material for the secure execution environment.

11. The system of claim 10, wherein the secure execution environment is further able to provide the keying material to additional secure execution environments initialized by the computing resource service provider to thereby causing multiple secure execution environments to have access to a set of cryptographic keys.

12. The system of claim 5, wherein the data associated with the set of computing resources is processed by encrypting the data associated with the set of computing resources according to a cryptographic key located in the secure execution environment.

13. The system of claim 12, wherein the cryptographic key is a public key of a public-private key-pair and a private key of the public-private key pair is maintained within the secure execution environment.

14. The system of claim 5, wherein the secure execution environment is instantiated at a location in the computing environment that is determined based at least in part on one or more locations of individual resources of the set of computing resources in the computing environment.

15. The system of claim 14, wherein the location of the secure execution environment determined is between an isolated network in the computing environment and a network interface of the isolated network.

16. The system of claim 5, wherein:
the instructions further include instructions that cause the system to instantiate the secure execution environment at the location determined for the secure execution environment; and
the instructions that cause the system to load the executable code include instructions that cause the system to load the executable code into the secure execution environment instantiated.

17. One or more non-transitory computer-readable storage medium collectively having stored thereon executable instructions that, as a result of execution by one or more processors of a computer system, cause the computer system to at least:
   receive, from a customer of a computing resource service provider, a request for a secure execution environment for a set of computing resources hosted in a computing environment of the computing resource service provider;
   select a location for the secure execution environment from a set of locations in the computing environment, the computing resource service provider is unable to access results of computation within the secure execution environment, the one or more computing resources enable management of the secure execution environment via a specialized instruction set, and hardware of the computer system prevents unauthorized access to data and running applications within the secure execution environment;
   load executable code for processing data in the secure execution environment at the location selected; and
   configure at least a portion of the computing environment to:
      configure at least a portion of the computing environment to utilize the secure execution environment at least in part to control access to the set of computing resources in accordance with the executable code by processing, at least in part in the secure execution environment:
         an application programming interface call requesting access to the set of computing resources, or
         a response to the application programming interface call; and
         cause data associated with the set of computing resources to be provided to the secure execution environment in accordance with the executable code loaded.

18. The non-transitory computer-readable storage medium of claim 17, wherein authorization to configure the secure execution environment is different from authorization to access the set of computing resources.

19. The non-transitory computer-readable storage medium of claim 17, wherein the data associated with the set of computing resources is provided to the secure execution environment as a result of a policy of the computing resource service provider specified by the customer.

20. The non-transitory computer-readable storage medium of claim 17, wherein the data associated with the set of computing resources is received as ciphertext encrypted with a key and the executable code for processing data further includes executable code that causes the secure execution environment to provide the data to the customer as the ciphertext.

21. The non-transitory computer-readable storage medium of claim 17, wherein the executable code for processing data further includes executable code that provides a subset of data for processing to the customer.

22. The non-transitory computer-readable storage medium of claim 17, wherein:
the data associated with the set of computing resources is network traffic; and
the executable code for processing data furthers includes executable code that causes the secure execution environment to receive the network traffic from an isolated network and provide the network traffic processed to an entity outside the isolated network.

23. The non-transitory computer-readable storage medium of claim 17, wherein the executable code for processing data further includes executable code that causes the secure execution environment to perform one or more of the following operations:
filter the data,
block the data,
validate the data, or
control access to the data.

24. The non-transitory computer-readable storage medium of claim 17, wherein the executable code for processing data further includes code that causes the secure execution environment to decrypt data using a first key.

25. The non-transitory computer-readable storage medium of claim 24, wherein the executable code for processing data further includes code that causes the secure execution environment to re-encrypt data using a second key.

26. The non-transitory computer-readable storage medium of claim 25, wherein the executable code for processing data further causes the secure execution environment to at least:
encrypt the second key using an asymmetric key to form an encrypted second key; and
provide the encrypted second key to the customer.

* * * * *